US011644523B2

(12) United States Patent
Mourning et al.

(10) Patent No.: US 11,644,523 B2
(45) Date of Patent: May 9, 2023

(54) RADIO DIRECTION FINDING METHOD AND SYSTEM

(71) Applicant: INTEGRITY COMMUNICATIONS SOLUTIONS, INC., Colorado Springs, CO (US)

(72) Inventors: Clark Phillip Mourning, Colorado Springs, CO (US); Thomas Cloud, Colorado Springs, CO (US); Michael Lenn Tipton, Florissant, CO (US); Stefan Josef Liller, Woodland Park, CO (US)

(73) Assignee: INTEGRITY COMMUNICATIONS SOLUTIONS, INC., Colorado Springs, CO (US)

( * ) Notice: Subject to any disclaimer, the term of this patent is extended or adjusted under 35 U.S.C. 154(b) by 79 days.

(21) Appl. No.: 17/216,346

(22) Filed: Mar. 29, 2021

(65) Prior Publication Data

US 2023/0113592 A1   Apr. 13, 2023

(51) Int. Cl.
*H01Q 3/00* (2006.01)
*G01S 3/46* (2006.01)
*G01S 3/48* (2006.01)
*G01S 3/04* (2006.01)
*H04B 7/08* (2006.01)

(52) U.S. Cl.
CPC ........ *G01S 3/46* (2013.01); *G01S 3/48* (2013.01); *G01S 3/043* (2013.01); *H04B 7/086* (2013.01)

(58) Field of Classification Search
CPC .............. G01S 3/46; G01S 3/043; G01S 3/48; G01S 3/50; H04B 7/086
USPC ....................................................... 342/372
See application file for complete search history.

(56) References Cited

U.S. PATENT DOCUMENTS

| | | | | |
|---|---|---|---|---|
| 4,975,710 A | * | 12/1990 | Baghdady | G01S 3/46 342/442 |
| 5,099,248 A | * | 3/1992 | Brommer | G01S 3/48 342/423 |
| 6,628,231 B2 | * | 9/2003 | Mayersak | G01S 19/51 342/357.36 |
| 6,677,898 B2 | * | 1/2004 | Cheng | H01Q 3/24 343/893 |

(Continued)

FOREIGN PATENT DOCUMENTS

JP        H06130138 A  *  5/1994  ............... G01S 3/32

OTHER PUBLICATIONS

International Search Report & Written Opinion dated Jun. 16, 2022 for PCT Application No. PCT/US2022/021429.

*Primary Examiner* — Chuong P Nguyen
(74) *Attorney, Agent, or Firm* — Dorsey & Whitney LLP

(57) ABSTRACT

Embodiments of the disclosure are drawn to apparatuses, systems, and methods for radio direction finding with an iterative ambiguity resolution algorithm. An antenna array may receive an emitted signal. Two or more phase shifts in the received emitted signal may be determined between two or more pairs of antennas of the antenna array. A set of possible expected phase shifts may be generated from at least two of the measured phase shift. To determine the proper one of the set of expected phase shifts, a set of initial guesses for parameters of a fitting equation may be generated and then each may be optimized to determine optimized fitting parameters. From these optimized fitting parameters a direction of arrival of the emitted signal may be determined.

27 Claims, 11 Drawing Sheets

(56) References Cited

U.S. PATENT DOCUMENTS

| | | | |
|---|---|---|---|
| 10,732,253 B2* | 8/2020 | Smith | H01Q 21/065 |
| 10,754,002 B1* | 8/2020 | Gibbons | G01S 3/801 |
| 2002/0027526 A1* | 3/2002 | Kohno | G01S 5/04 |
| | | | 342/418 |
| 2004/0087294 A1* | 5/2004 | Wang | H04B 7/084 |
| | | | 455/273 |
| 2004/0160364 A1 | 8/2004 | Regev | |
| 2011/0260911 A1 | 10/2011 | Sapp | |
| 2014/0159954 A1 | 6/2014 | Stoddard | |
| 2014/0347212 A1* | 11/2014 | Tuxen | G01S 3/48 |
| | | | 342/147 |
| 2015/0070217 A1 | 3/2015 | Sharawi et al. | |
| 2015/0192656 A1* | 7/2015 | Werner | G01S 3/46 |
| | | | 342/442 |
| 2017/0059685 A1* | 3/2017 | Moghaddasi | G01S 3/043 |
| 2018/0306888 A1 | 10/2018 | Robinson et al. | |

* cited by examiner

RADIO DIRECTION FINDING METHOD AND SYSTEM

TECHNICAL FIELD

Embodiments of the invention relate generally to radio direction finding, and particularly, to a method and system that resolve estimated direction ambiguities in a computationally efficient manner.

BACKGROUND

Radio direction finding (RDF) may be used to determine the direction from an antenna to an emitter of electromagnetic radiation (e.g., in the radio frequencies). This may be useful for a variety of applications, for example in aiding navigation of a moving platform such as an aircraft, a land vehicle, or a marine vessel. One or more antennas may be mounted on the platform and may generate one or more signals based on the received radiation from the emitter. In some cases, the emitter may additionally or alternatively be moving resulting in relative movement of the emitter and antenna. The direction of the emitter relative to the antenna may be calculated based on the one or more signals generated by the antenna responsive to the received radiation from the emitter.

In some existing RDF algorithms, the signals at an antenna array are used to determine a phase difference between the radiation which arrived at different antennas to calculate the direction. However, the use of such measured phase may lead to a problem of ambiguity in the calculations, since the measured phase has a maximum value of +/−180°, but this may represent phase differences which are much larger than this range. This may lead to ambiguity in the calculated direction. While various methods for resolving such ambiguities have been proposed, such algorithms are typically mathematically and/or computationally intensive. Accordingly, developers of RDF methods and systems continue to seek improvements thereto.

SUMMARY

In at least one aspect, the present disclosure relates to a method. The method includes receiving an emitted signal from an emitter at a first antenna and a second antenna. The method includes determining a measured phase shift between the emitted signal received by the first antenna and the emitted signal received by the second antenna compared to a respective reference, calculating a plurality of possible phase shifts based on the measured phase shift, and fitting parameters of a cosine function to the plurality of possible phase shifts. The fitting includes selecting a set of initial guesses for the fitting parameters, optimizing each of the set of initial guesses to generate a set of optimized fitting parameters, and selecting one of the set of optimized fitting parameters. The method includes determining elevation and azimuth angles to the emitter based on the selected one of the set of optimized parameters.

The method may also include optimizing each of the set of initial guesses with a Gauss-Newton algorithm. The method may also include counting a number of iterations it takes each initial guess of the set of initial guesses to settle and filtering the set of optimized fitting parameters based on the number of iterations. The method may also include selecting the set of initial guesses based, in part, on a frequency of the emitted signal. The fitting parameters may include amplitude and initial phase of the cosine equation.

The method may also include receiving the emitted signal at a third antenna and a fourth antenna, determining a second measured phase shift between the emitted signal received by the third antenna and the emitted signal received by the first antenna, determining a third measured phase shift between the emitted signal received by the fourth antenna and the emitted signal received by the first antenna, calculating a second plurality of possible phase shifts based on the second measured phase shift and calculating a third plurality of possible phase shifts based on the third measured phase shift, and fitting parameters of the cosine function to the possible phase shifts, the second plurality of possible phase shifts, and the third plurality of possible phase shifts.

The method may also include calculating the plurality of possible phase shifts based on a frequency of the emitted signal. The method may also include directing a mobile platform based on the determined elevation and azimuth. The method may also include locating the emitter based on the determined elevation and azimuth. The method may also include sampling antenna signals from the first antenna and the second antenna to determine the measured phase shift and updating the determined elevation and azimuth angles based on each sample. The determined elevation and azimuth are updated every 10, 20, 30, 40, 50, 60, 70, 80, 90, or 100 msec.

In at least one aspect, the present disclosure relates to an apparatus including an antenna array, a processor, and a memory. The antenna array includes a plurality of antennas, each of which receives an emitted signal from an emitter and provides a respective antenna signal based on the received emitted signal. The memory is encoded with executable instructions, which when executed by the processor cause the processor to determine at least two measured phase shifts based on the antenna signals received from at least two pairs of antennas of the plurality of antennas, determine a plurality of possible phase shifts based, at least in part, on the at least two measured phase shifts, fit parameters of a cosine equation to the plurality of possible phase shifts by selecting a set of initial guesses for the parameters, optimizing each of the set of initial guesses to generate a set of optimized fitting parameters and selecting one of the set of optimized fitting parameters, and determine a direction of arrival of the emitted signal based on the selected one of the optimized fitting parameters.

The executable instructions, when executed by the at least one processor may also cause the apparatus to optimize each of the set of initial guesses using a Gauss-Newton algorithm. The executable instructions, when executed by the at least one processor may also cause the apparatus to count a number of iterations of the Gauss-Newton algorithm for each of the set of initial guesses and terminate runs where the number of iterations crosses a threshold.

The apparatus may also include a mobile platform, where the antenna array is mounted on mobile platform. The apparatus may also include a tuner configured to tune the plurality of antennas to a frequency between 30 MHz and 3 GHz. One of the plurality of antennas may be designated as a reference antenna, and a remainder of the plurality of antennas may be designated as secondary antennas. The plurality of possible phase shifts are calculated between each of the secondary antennas and the reference antenna. The antenna array may have circular geometry, rectangular geometry, or combinations thereof. The apparatus may include capture electronics configured to sample the antenna signals from the plurality of antennas. The apparatus may include a switch configured to selectively couple a selected one of the plurality of antennas to the capture electronics.

In at least one aspect, the present disclosure relates to a method. The method includes receiving an emitted signal from an emitter at a plurality of antennas, and generating a plurality of measured phase shifts based on the signals received at pairs of the plurality of antennas. The method includes generating a set of possible phase shifts based on each of the plurality of measured phase shifts and generating a set of initial guesses for parameters of a fitting equation to the set of possible phase shifts. The method includes optimizing each of the set of initial guesses to determine optimized fitting parameters and determining an azimuth and elevation angle to the emitter based on the optimized fitting parameters.

The fitting equation may be a cosine equation and the fitting parameters may be an amplitude and initial phase of the cosine equation. The method may include optimizing each of the set of initial guesses to generate a set of preliminary optimized fitting parameters and selecting one of the set of preliminary optimized fitting parameters as the optimized fitting parameters. The method may include determining if the optimization for each of the set of initial guesses is settling and terminating the optimization of selected ones of the set of initial guesses which are not settling.

The method may include optimizing each of the set of initial guesses using a Gauss-Newton algorithm. The method may include tuning the plurality of antennas to receive the emitted signal at a frequency. The method may include generating the set of possible phase shifts for a respective one the plurality of measured phase shifts based on the physical relationship between the pair of the plurality of antennas associated with the respective one of the plurality of measured phase shifts.

DETAILED DESCRIPTION

Figure 1:
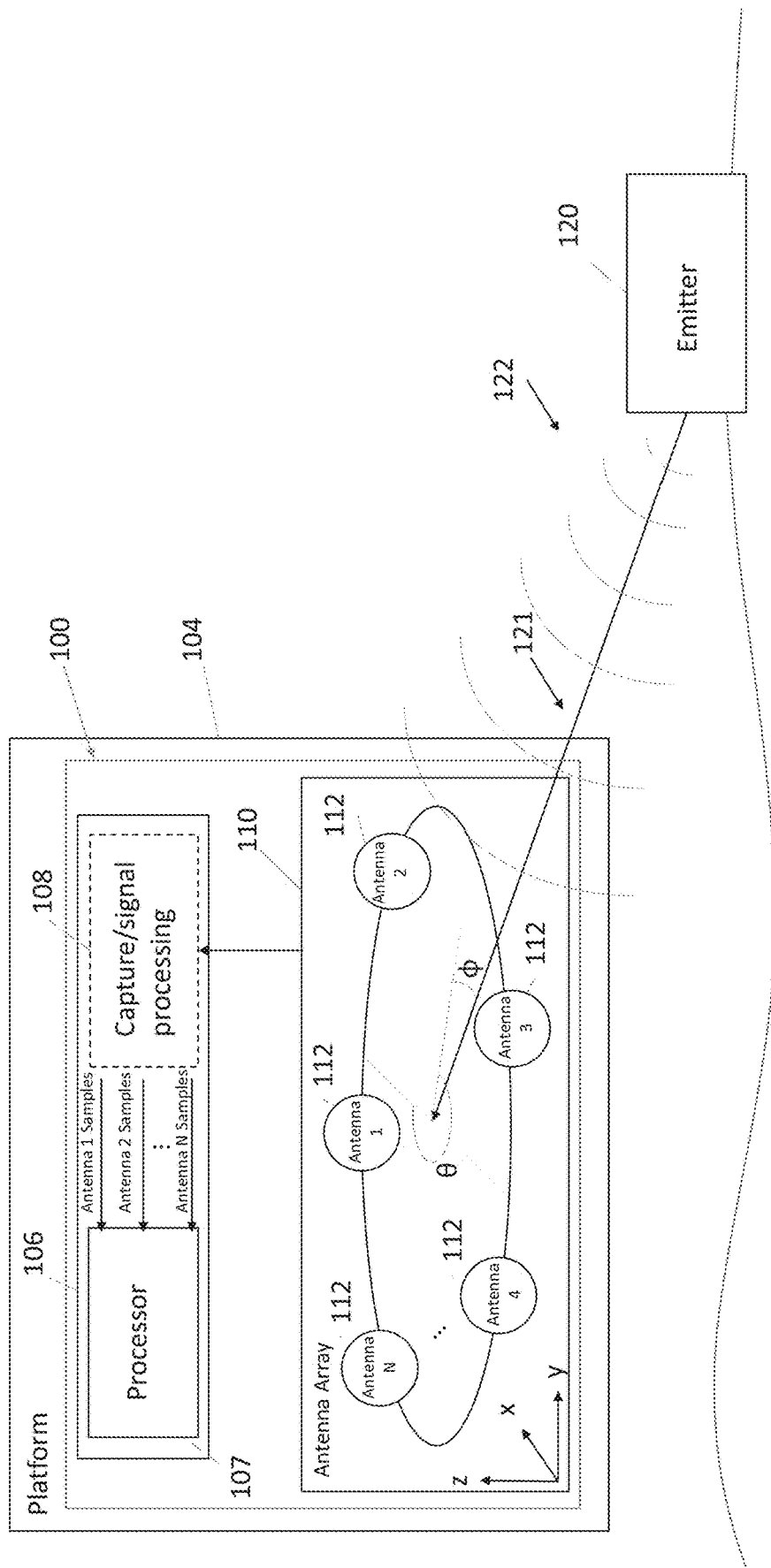
FIG. 1 is a block diagram of an RDF system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration, specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

RDF systems typically use an array of antennas to detect radiation received from an RF emitter and generate one or more antenna signals based on the detected radiation, which may also be referred to as an RF signal. The antenna signals may be used to determine properties of the radiation, which in turn may be used to calculate a direction from the antenna array to the emitter. For example, the signals from a pair of antennas may be used to calculate a phase difference in the RF signal arriving at the pair of antennas. With the geometry of the antenna array being known, the direction may be calculated based, at least in part, on this phase difference. In typical systems, an antenna array includes multiple pairs of antennas. Using multiple phase differences from multiple pairs of antennas may improve the accuracy of the determination of the direction to the signal emitter.

Due to physical limitations, the measured phase difference from a given pair of antennas may be restricted to a range of 360° (e.g., from +180° to −180°). However, the true phase difference may be much larger or smaller in absolute value than 180°. Accordingly, the measured phase difference may be modulo 360° of the expected phase difference, which may make it difficult to tell if a measured phase difference of X represents an expected phase difference of X or X+n*360°. This ambiguity may affect the overall result, since different possible values that the expected phase shift represents may lead to different results for the direction to the emitter. The ambiguity becomes much more likely to effect the result as the frequency of the RF signal increases. Various solutions have been proposed for determining a true phase difference from the measured phase difference, such as look up tables and fitting equations. However, resolving this ambiguity with existing solutions is often very computationally intensive, which causes the rate at which the direction to the emitter is calculated to be relatively slow. This slower rate of direction finding can be particularly detrimental in the context of moving platforms (e.g., either the emitter, the receiver antenna(s) or both). In addition, existing methods for resolving the ambiguity often impose requirements or limitations on the antenna geometry (e.g., some known algorithms require a circular array, with an even number of evenly spaced antennas). These limitations of the existing solutions can make them difficult or impossible to use with certain systems, such as retrofitting them to existing equipment that may not meet the geometry limitations. The direction finding solution proposed herein addresses the ambiguity issue in a computationally efficient manner and is also less restrictive with respect to the antenna geometry.

The present disclosure is drawn to apparatuses, systems and methods for radio direction finding using a novel algorithm that provides for reduced computational load and greater freedom in the geometry of the antenna array. In some embodiments herein, the algorithm receives information from an antenna array which may include any suitable number of antennas configured to receive an RF signal from an emitter. While the term array is used herein to refer to the a plurality of antennas, it will be understood that the individual antennas of the array need not be in any particular, or even regular, pattern, as long as the geometry (e.g., relative spatial position of each antenna) of the array is known, and as long as the secondary antennas are a uniform distance from the reference antenna. Notably, unlike many existing techniques for radio direction finding where the antenna geometry must ensure that the antennas are spaced at a distance of least at ½ the wavelength of the highest frequency signal of interest, the algorithm described herein does not impose such a limitation, which can enable direction finding in a wider range of signal frequencies (e.g., ranging from and including the low frequency band up to and including the super high frequency band.) The antennas each generate a signal based on the received RF signal. Based on these signals, a processor is configured to determine a measured phase shift between at least one pair of the antennas (e.g., a phase shift between a secondary antenna and a reference antenna) and then calculate a number of possible phase shifts based on the measured phase shift. The measured phase shift may represent an angle between −180° and 180°, however the expected phase shift used computationally to calculated direction of arrival may have a much greater range of values. Accordingly, the measured phase shift may be a 'wrapped' version of the expected phase shift (e.g., modulo 360°), but it may not be known what the expected phase shift is (e.g., how many times it was wrapped). The possible phase shifts may represent all possible 'unwrapped' values of the measured phase shift.

The processor is further configured to resolve the ambiguity in the phase shifts through an iterative minimization process. For example, in embodiments herein, the processor determines which of the possible phase shifts is the actual or correct expected phase shift by fitting parameters of a cosine equation to the possible phase shifts. The fitting process may involve, first selecting a set of initial guesses for the fitting parameters and then using Gauss-Newton optimization based on each of the initial guesses to determine the fitting parameters that optimize the cosine equation. These determined fitting parameters, which may also be referred to as optimized fitting parameters, may then be used by the processor to determine a direction of arrival (DoA) (e.g., by computing elevation and azimuth angle) of the RF signal which provides the direction of the emitter in relation to the array. By using of a set of initial guesses with a Gauss-Newton optimization, the processor is configured to resolve the ambiguity issue and determine the true DoA at a speed that is significantly greater than known methods. Additional techniques for further enhancing the computational efficiency of the described algorithm may include configuring, or applying filters to, the Gauss-Newton algorithm for example to terminate the optimization for any initial guesses which do not converge to a minimum within a predetermined time and/or number of optimization steps, and/or by tailoring the convergence criteria to an acceptable value (e.g., a value indicating less than approximately $1e^{-4}$ change between successive steps). The use of an ambiguity resolution algorithm according to embodiments of the present disclosure may allow for rapid determination of the direction to the emitter (e.g., on the order of tens of milliseconds, such as within approximately 40-60 milliseconds or less, depending on the hardware used to make the determination), which in turn may allow for more rapid utilization of (e.g., taking action based on) this information. In addition, as noted above, the algorithm described herein imposes little, if any, requirements on geometry of the antenna array (as long as there are at least two antennas to provide at least one measured phase shift, and as long as the secondary antennas are a uniform distance from the reference antenna). The configurational freedom of the array can be advantageous for many reasons, including the ability to easily implement this algorithm on platforms with existing antenna arrays that may not otherwise satisfy geometry requirements or limitations of other ambiguity resolution algorithms.

FIG. 1 is a block diagram of a radio direction finding (RDF) system according to some embodiments of the present disclosure. The RDF system 100 may be provided on a platform 104, which may be a movable or moving platform (e.g., a vehicle) or a fixed platform. The platform 104 supports the equipment (e.g., antenna and other electronics) of the RDF system 100, and the RDF system 100 may thus be used to a direction from the platform to an emitter 120 of a radio signal. The platform 104 supports an antenna array 110 with a number of antennas 112 (e.g., Ant1 through Ant N). Each of the antennas 112 is configured to detect or receive the RF signal 122 transmitted by emitter 120 and produce a respective antenna signal responsive to detected RF signal 122. The antenna signals are provided to a computing system 106, which includes one or more processors, shown illustratively as processor 107. In some embodiment, the antenna signals may be conditioned or otherwise pre-processed by optional capture and signal processing equipment 108. The processor 107 is configured to calculate, in relation to the reference coordinate system of the antenna array, the elevation angle 4 and azimuth angle θ, e.g., the DoA, between the antenna array 110 and the emitter 120 based on the signals generated by the antennas 112.

The platform 104 may, in some embodiments, be a movable or moving platform such as an aerial platform. For example, the platform 104 according to some embodiments may be a crewed platform such as an airplane or an uncrewed platform such as a drone. In other embodiments, the movable or moving platform may be a manned or unmanned land vehicle or marine vessel. The platform 104 may move relative to the emitter 120, and it may be desirable to update the platform's 104 knowledge of the direction to the emitter 120. For example, the emitter 120 may represent a navigational aide, and the platform 104 may use the direction to the emitter 120 to calculate its current position and/or determine its heading. In another example, the emitter 120 may represent an object of interest, and the platform 104 may track a direction to the emitter 120 to determine a location of the emitter 120. In some embodiments, the emitter 120 may be moving, additionally or alternatively to the platform 104. In some embodiments, both the platform and the emitter may be moving. Determining the relative direction between the platform 104 and the emitter can be useful for various purposes, including navigation, object tracking and/or avoidance, etc. The emitter 120 produces a signal 122 which may be detected by the antenna array 110 of the RDF system 100. The emitter 120 may be any device which produces enough electromagnetic radiation to be detectable by the antennas of array 110. In some examples, the emitter 120 may be a source of radiation, which is deliberately generated for RDF purposes, such as a radio frequency transmitter used as a navigational aide. In some examples, the emitter 120 may be a device, which emits radiation for other reasons unrelated to or incidental to the RDF functionality of system 100. For example, the emitter 120 may be a communication device such as a cell phone or any other electronic device with a wireless communication capability, a vehicle or other moving or moveable platform equipped with wireless signal transmission capability. While the present disclosure is described generally with respect to radio frequency (RF) transmissions and an RF signal 122, it should be understood that the emitter may produce radiation in other frequency ranges. In some embodiments, the RF signal 122 may have a relatively narrow spectrum. In some embodiments the RF signal 122 may be a broadband signal. In some embodiments, additional filtering hardware or software may be used to obtain the phase shift from broadband signals.

The antenna array 110 may be tunable to detect a specific center frequency of the RF signal 122. In some embodiments, the computing system 106 may tune the antenna array 110 to specific frequencies in order to determine a direction to specific emitters 120. In some embodiments, the antenna array 110 may be configured to detect frequencies between about 30 MHz and 3 GHz.

The antenna array 110 may have a number of individual antennas 112. In the illustration of FIG. 1, the antennas 112 are shown arranged with a roughly circular geometry. Other geometries, such as rectangular geometries may be used in other example embodiments. In some embodiments, the antennas 112 may have even spacing relative to each other. In some embodiments, the antennas 112 may have non-uniform spacing. As explained in more detail herein, there is a uniform distance between each pair of antennas used to collect a phase shift measurement. In another example, one of the antennas 112 may be designated as a reference antenna, and the other antennas may act as secondary antennas. In the case of a circular array, the reference antenna may be located at a center of the circle, and the secondary antennas around the circumference and thus there is a uniform distance between the reference antenna and each of the secondary antennas, although the secondary antennas may have non-uniform spacing with respect to each other. Examples herein will generally be described with respect to a system where there is a single reference antenna and multiple secondary antennas a set distance from that reference antenna (although not necessarily arranged in a circular fashion), however it should be understood that other example geometries and measurement schemes may also be used. For example, rather than a single reference antenna, a first measurement may be between antenna 1 and antenna 2, a second measurement may be between antenna 3 and antenna 4, etc, as long as each pair has uniform spacing from each other. For example, the antennas may be evenly spaced around the perimeter of a circle, may be laid out in a grid, or in other geometries.

The antenna array 110 is associated with a reference coordinate system (e.g., x, y, and z axes as shown), relative to which the direction to the emitter 120 is determined. While a Cartesian coordinate system is shown in FIG. 1 for illustration, anther suitable reference coordinate system, such as a polar, cylindrical or spherical coordinate system may be used in other examples. Example coordinate systems used for detecting a direction to an emitted signal are discussed in more detail with reference to FIGS. 4 and 6.

As shown in FIG. 1, the RF signal 122 may leave the emitter 120 and travel towards the antenna array 110 along a direction or vector 121, shown in FIG. 1 as the shortest distance between the antenna array 110 and the emitter 120. The RF signal 122 may be radiated or otherwise provided by the emitter 120 in other directions (e.g., an omnidirectional emitter) however for simplicity of illustration, only a portion of the RF signal 122 which is received by the antenna array 110 is shown in FIG. 1. Each antenna 112 of the array 110 may receive the RF signal 122 and generate an electrical signal, also referred to herein as antenna signal, based on the received RF signal 122. The spacing between the antennas 112 of the antenna army 110 may cause different antennas 112 to receive the RF signal 122 at different phases, intensities, etc.

In some embodiments, the antenna signals are analyzed to extract one or more properties, such as to determine or measure a phase difference between the antenna signals of one or more pair of antennas of the array. In some embodiments, one of the antennas in the array may be considered the reference antenna and other ones of the antennas of the array may be secondary antennas, whereby the phase difference of the signal measured at those secondary antennas may be taken with respect to the signal from a reference antenna. For example, if the antenna array 112 includes N antennas, arranged in an evenly spaced circular pattern as shown, then each pair may take a measurement (e.g., Ant2-Ant1, Ant4-Ant3, etc.) for a total of N/2 measurements. In another embodiment, antenna 1 may be located at a center of the array 110 (instead of along the circumference as shown in FIG. 1) and antenna 1 may act as the reference antenna, then N−1 phase difference measurements may be obtained from the N−1 pairs of antennas, each pair including the reference antenna and one of the other remaining N−1 antennas of the array(e.g., Ant2-Ant1, Ant3-Ant1, Ant4-Ant1, etc.).

Optional capture and signal processing electronics 108 may receive the signals from the antennas 112 and condition them in one or more ways before providing the conditioned signals to the processor 107. For example, since the antenna signals may vary in time, the capture and signal processing electronics 108 may digitize the RF signal by sampling the antenna signals to capture a state (e.g., a voltage) of the signals at a particular moment in time, referred to herein as samples (e.g., ant1 sample, ant2 sample, etc.). In some embodiments, the signal processing electronics 108 may sample the RF signal at a set sample rate, which may be selected based on the signal's frequency. The capture and signal processing electronics 108 may perform various signal processing operations such as filtering the signals, amplifying the signals, converting the RF signals to digital signals etc. In some embodiments, the capture and signal processing electronics 108 may be provided by one or more electronic components separate from the computing system that executed the RDF algorithm and in communication therewith. In some embodiments, one or more processes of the capture and signal processing electronics 108 may be integrated into the antenna army 110.

The processor 107 may receive the digitized antenna signals (e.g., Ant1 Samples, Ant2 Samples, etc.) and may use those signals to determine the direction between the mobile platform 104 and the emitter 120 as will be further described. The computing system 106 may be configured to determine the direction of arrival of the signal 122 with reference to a coordinate system, which may be a reference coordinate system of the antenna array 110 or otherwise associated with the platform 104 to which antenna 110 is mounted. To determine the direction of arrival of signal 122, the computing system 106 calculates an elevation angle $\phi$ (e.g., and angle between the principle axis of the RF signal 122, such as the vector 121, and an x-y plane) and an azimuth angle $\theta$ (e.g., an angle between the x-axis and the projection of the principle axis of the RF signal 122 onto the x-y plane). The determination of the direction is described in more detail herein. The DoA may represent the vector from the antenna array 110 coordinate system to the emitter 120 (e.g., the reverse of vector 121).

Figure 2:
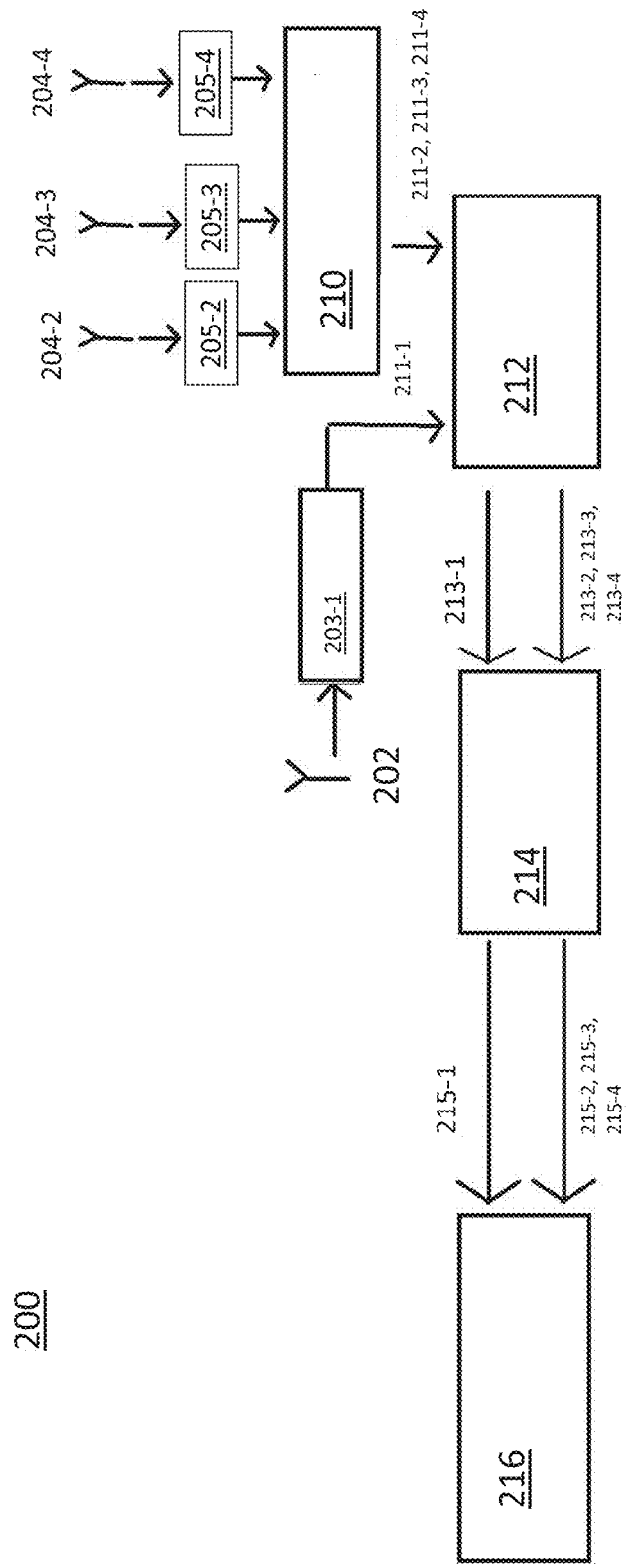
FIG. 2 is a schematic diagram of an RDF system according to some embodiments of the present disclosure.

FIG. 2 is a schematic diagram of an RDF system 200 according to some embodiments of the present disclosure. The components of RDF system 200 may be used to implement RDF system 100 of FIG. 1. The RDF system 200 show an example arrangement of hardware components that may be used in implementing the RDF algorithm according to the present disclosure. In other embodiments, different suitable arrangements of components may be used, such as configurations including a larger or fewer number of antennas, and additional or fewer hardware components located between the antenna inputs and the processor that executes the RDF algorithm.

In the illustrated example, the RDF system 200 includes four antennas, which include a first (or reference) antenna 202-1 and a plurality (e.g., second, third, and fourth) secondary antennas 204-2, 204-3, and 204-4. Antenna 202-1 is associated with an amplifier 203-1 and each of the antennas 204-2 to 204-4 is associated with a respective amplifier 205-2 to 205-4, for amplifying the signal detected by the respective antenna. The antennas 202 and 204 may be arranged together as part of an antenna array (e.g., array 110 of FIG. 1). The secondary antennas 204 may each be located a set distance from the reference antenna 202 (although they may have variable distance from each other). Each antenna and amplifier may generate an electrical antenna signal 211-1 to 211-4 based on received electromagnetic radiation (e.g., from emitted signal such as 122 of FIG. 1). Each of the secondary antennas 204 (and respective amplifier 205) may be selectively coupled (e.g., for transmitting the detected antenna signal) to a tuner 212 via a switch 210. The tuner 212 may determine which frequency (e.g., center frequency and/or frequency range) the antennas 202-1 and 204-2 to 204-4 are tuned to. The tuner 212 may provide signals 213-1 to 213-4 at the selected frequencies (e.g., intermediate frequency signals) to a field programmable gate array (FPGA) 214 for signal processing. The FPGA 214 may implement, in part, the capture and signal processing electronics 108 of FIG. 1. The FPGA 214 is configured to digitize the antenna signals and provide baseband sampled signals 215-1 to 215-4 to a processor 216.

The antennas 202-1 and 204-2 to 204-4 may be arranged together as part of an antenna array. Antenna 202-1 may be used as a reference antenna, while antennas 204-2 to 204-4 may be used as secondary antennas. A phase shift in the RF signal 211-2 to 211-4 received by each of the secondary antennas 204-2 to 204-4 may be measured with respect to the RF signal 211-1 received by the reference antenna 202-1. In some embodiments, the reference antenna 202-1 and secondary antennas 204-2 to 204-4 may be the same as each other. In some embodiments, the reference antenna 202-1 may be selected from one of a set of antennas, and the remainder of the antennas may then be the secondary antennas 204-2 to 204-4. The amplifiers 203-1 and 205-2 to 205-4 may amplify a voltage generated in the antenna as the emitted signal impinges on the antenna 202-1 or 204-2 to 204-5 respectively. Accordingly, the amplifiers 203-1 and 205-2 to 205-4 may provide a raw antenna signal 211-1 to 211-4 from a respective antenna.

The switch 210 controls which of the secondary antennas 204 is coupled to the tuner 212 at any given time. Accordingly, based on a state of the switch 210, the tuner may receive a first pair of antenna signals (e.g., 211-1 and 211-2), a second pair of antenna signals (e.g., 211-1 and 211-3), or a third pair of antenna signals (e.g., 211-1 and 211-4). The switch may be a digitally controlled electronic switch. In some embodiments, the switch 210 may be configured to cycle through the different possible pairs of antenna signals. In some embodiments, the switch 210 may switch between pairs in accordance with a predefined pattern for cycling through the possible pairs. In some embodiments, the system 200 may include a delay circuit configured to apply delays, as appropriate, to the signals from different antenna pairs so as to account for the temporal differences in when the different pairs of signals are recorded. In some embodiments, the processor may manage the delays between signals by applying a phase shift. In some embodiments, the switch 210 may be omitted, and the tuner 212 may receive all the antenna signals ant1-ant4 RF simultaneously.

The tuner 212 may select a frequency of the raw antenna signals 211-1 to 211-4 and provide tuned signals at an intermediate frequency (IF) 213-1 to 213-4. The tuner 212 may tune the signals to a particular center frequency in order to detect a signal in a desired frequency. In some embodiments, the processor 216 may control the tuner 212, e.g., as to which frequency to select.

An analog to digital converter (ADC) circuit, shown here as implemented on a FPGA, 214 may periodically sample the tuned signals 213-1 to 213-4 to produce the antenna signal samples 215-1 to 215-4, thereby digitizing the RF signals. The ADC circuit 214 provides the sampled signals ant1-ant4 to the processor 216, which perform RDF based on the sampled signals.

Figure 3:
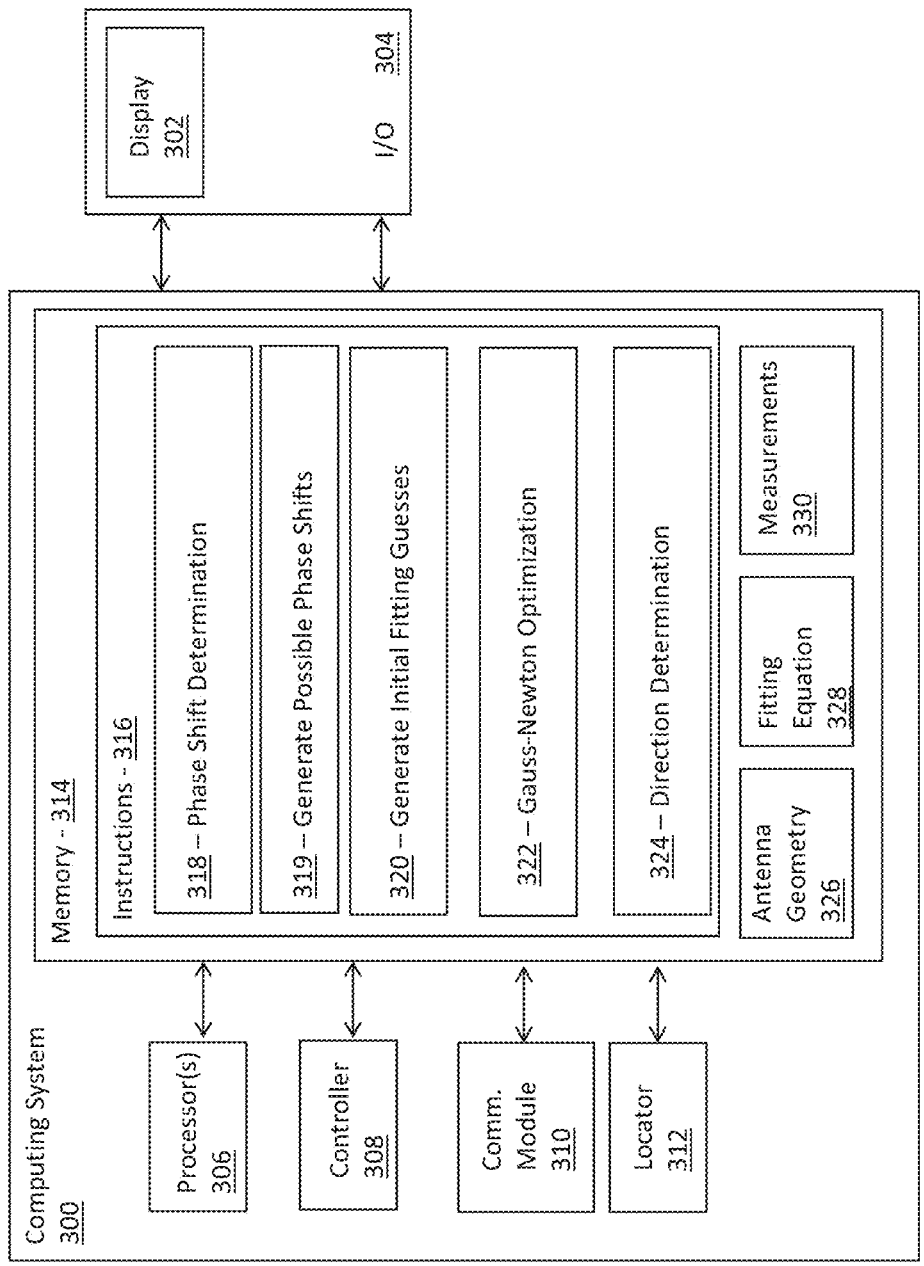
FIG. 3 is a block diagram of a computing system according to some embodiments of the present disclosure.

FIG. 3 is a block diagram of a computing system according to some embodiments of the present disclosure. The computing system 300 may be used to implement the computing system 106 of FIG. 1. The computing system 300 includes one or more processors 306, a controller 308, a communications module 310 and a locator 312 all coupled to a memory 314. The memory 314 may include instructions, which may be executed by the processor 306 to perform an RDF algorithm as described in more detail herein. The instructions 316 may include subsets of instructions, illustratively represented as blocks 318, 319, 320, 322 and 324, each of which is configured, when executed by processor 306 to cause the processor to perform functionality or steps associated with the RDF method described herein. For example, the set of instructions (or block) 318 are configured, when executed by processor 306, for determining a measured phase shift based on antenna signals. The set of instructions (or block) 319 are configured, when executed by processor 306, for generating a set of possible expected phase shifts based on the measured phase shift. The set of instructions (or block) 320 are configured, when executed by processor 306, for generating initial fitting guesses. The set of instructions (or block) 322 are configured, when executed by processor 306, for performing an optimization (e.g., a Gauss-Newton optimization) of fitting parameters based on the initial fitting guesses, and set of instructions (or block) 324 are configured, when executed by processor 306, for determining a direction to an emitter based on the optimized fitting parameters. In addition to instructions, the memory 314 may include information used by the processor 306 when executing the instructions 316, such as information about antenna geometry 326, a fitting equation or model 328, and measurements (e.g., samples of the antenna signals) collected by an antenna array (e.g., array 110 of FIG. 1). In some embodiments, the computing system 300 may be coupled to components such as a display 302 and/or other input/output devices 304 which may allow a user to interact with the computing system 300 (e.g., to view a visual representation of the determined DoA).

While certain blocks and components are shown in the example computing system 300, it should be understood that different arrangement with more, fewer, or different components may also be used. For example, while a single processor 306 is shown in FIG. 3, multiple processors may be used. In some embodiments, different processors may be used for different tasks (e.g., a graphics processor, etc.). In some embodiments, the computing system 300 may represent a single computer (e.g., with one or more processors local to the single computer), or multiple networked computers, each having its own one or more processors that may operate together to execute the functionality of computing system 300. In some embodiments, the functions described with respect to FIG. 3 may be distributed across multiple processor and/or computers (e.g., in a parallel processing arrangement). Different computing components may be coupled together in any number of ways, such as wired connections, wireless connections, and combinations thereof. In some embodiments, various components described with respect to FIG. 3 may be omitted. For example, in some embodiments, the display 302 and I/O 304 may be omitted. In some embodiments, additional components not shown in FIG. 3 may be added.

The processor(s) 306 may execute the instructions 316 encoded in memory 314 to perform the steps of the RDF algorithm. When executing the RDF algorithm, the processor 306 uses measurements 330 (e.g., digitized antenna signals detected by antenna array) to calculate a direction (e.g., elevation and azimuth angles) to an emitter. The measurements 330 may represent samples in time of the signals generated by the antennas as an RF signal impinges on them. In some embodiments, the measurements may be "live" or real-time measurements, which in the context herein implies that RDF is performed as the antenna signals are being recorded by the antennas and samples are received by the computing system 300. As new signals are detected and received, new "live" measurements may be recorded (or buffered) and the measurements 330 may be updated with the new samples of the antenna signals so that the calculation of DoA can be updated. The algorithm herein enables calculation of DoA at a significantly higher frame rate (e.g., a new DoA calculation approximately every 40-60 milliseconds or less), provide a near real-time direction finding capability. In other embodiments, the measurements 330 may represent antenna signals which were previously collected and are not processed in real-time (i.e. as they are collected from the antenna array).

The processor 306 may command the controller 308, which may control the collecting of the measurements 330 and/or one or more additional devices (e.g., the array tuner). The controller 308 may also include, or communicate with, one or more devices (e.g., a navigation system, a tracking system, etc.) that use the calculated direction to the emitter for various purposes. For example, the controller 308 may be used to control a tuning of the antenna array to determine a frequency at which the measurements 330 are collected. The controller 308 may also operate capture electronics (e.g., 108 of FIG. 1) to control aspects of signal collection such as sampling rate, filters applied to the raw antenna signals etc. In some embodiments, the controller 308 may also be used, and/or communicated with other systems of the platform, to perform one or more operations based on the determined emitter signal direction. For example, the controller 308 may change a direction of a mobile platform (e.g., 104 of FIG. 1) based on the determined direction to the emitter, by generating steering commands towards or for avoidance of the emitter.

The computing system 300 may include a communications module 310 which may send or receive information to systems outside the computing system 300. For example, the communications module 310 may send and/or receive information using one or more wireless systems (e.g., wifi, Bluetooth, radio, satellite communications, etc.). For example, the communications module 310 may provide information about the direction to the emitter and/or receive instructions about which emitter to target (e.g., which frequencies to tune the antenna array to).

The locator 312 may generate information about the current location of the mobile platform that includes the antenna array. In some embodiments, the locator 312 may use information based on the direction to the emitter to determine a location. In some embodiments, the locator may use one or more other methods (e.g., a global positioning system) to determine a location, and then the processor 306 may determine a location of the emitter based on the location from the locator 312 and the direction to the emitter. In some embodiments, the mobile platform may move relative to the emitter, and multiple directions to the emitter from multiple locations may be used to triangulate a location of the emitter.

The computing system 300 may be coupled to a display 302, which may be used to indicate information about the results (or operation) of the RDF to a user. For example, a direction to the emitter may be graphically presented. In some embodiments, the display 302 may be a general purpose display (e.g., a monitor). In some embodiments, the display 302 may be specialized for presenting information. For example a heads up display or other instrument of the mobile platform (e.g., part of a cockpit display in an aircraft). Similarly, the computing system 300 may be coupled to an input/output system 304. The I/O may represent general purpose equipment (e.g., a mouse, computer, joystick, touchscreen etc.) or may represent specialized controls (e.g., buttons, sliders or other controls mounted in a cockpit or other control center of an airframe).

As noted above, the memory 314 includes instructions 316 which, when executed by processor 306, program the processor to perform RDF using the algorithm described herein. In explaining the operations embodied in instruction sets or blocks 318-324, reference will be made also to FIGS. 4-9, which show various graphs to assist with visualization of the steps performed by the processor 306 when executing the instructions 316.

The instructions 316 may include a set of instructions 318 for determining, by the processor 306, a measured phase shift based on measured antenna signals. The phase shift may be determined between a pair of the antennas, such as between a secondary antenna and a reference antenna. Each pair of antennas may be defined by their known physical relationship to each other, which may be stored as antenna geometry 326 in the memory 314.

The instructions 318 may implement various techniques for recovering the phase information from a pair of antennas. As described, each pair of antennas may receive a signal from an emitter. However, due, in part, to the physical separation between the two antennas, there may be a phase difference between the signals. The antenna signals, which may also be referred to as RF signals, may generally take the form of oscillating waves (e.g., sine waves), the offset between which may be defined as the phase shift or difference. When executing instructions 318, the processor determines, using any suitable signal processing technique, the phase shift or difference between the signal received by a reference antenna and secondary antenna. For example, the processor 306 may fit a sine equation to the measured signal from each antenna, and may determine the phase difference between the sine equations fitted to each measured signal, may apply a Fourier transform to extract the frequency of the signal, or any other technique for determining the phase shift. Numerous techniques are known for determining a phase shift between RF signals.

Figure 4:
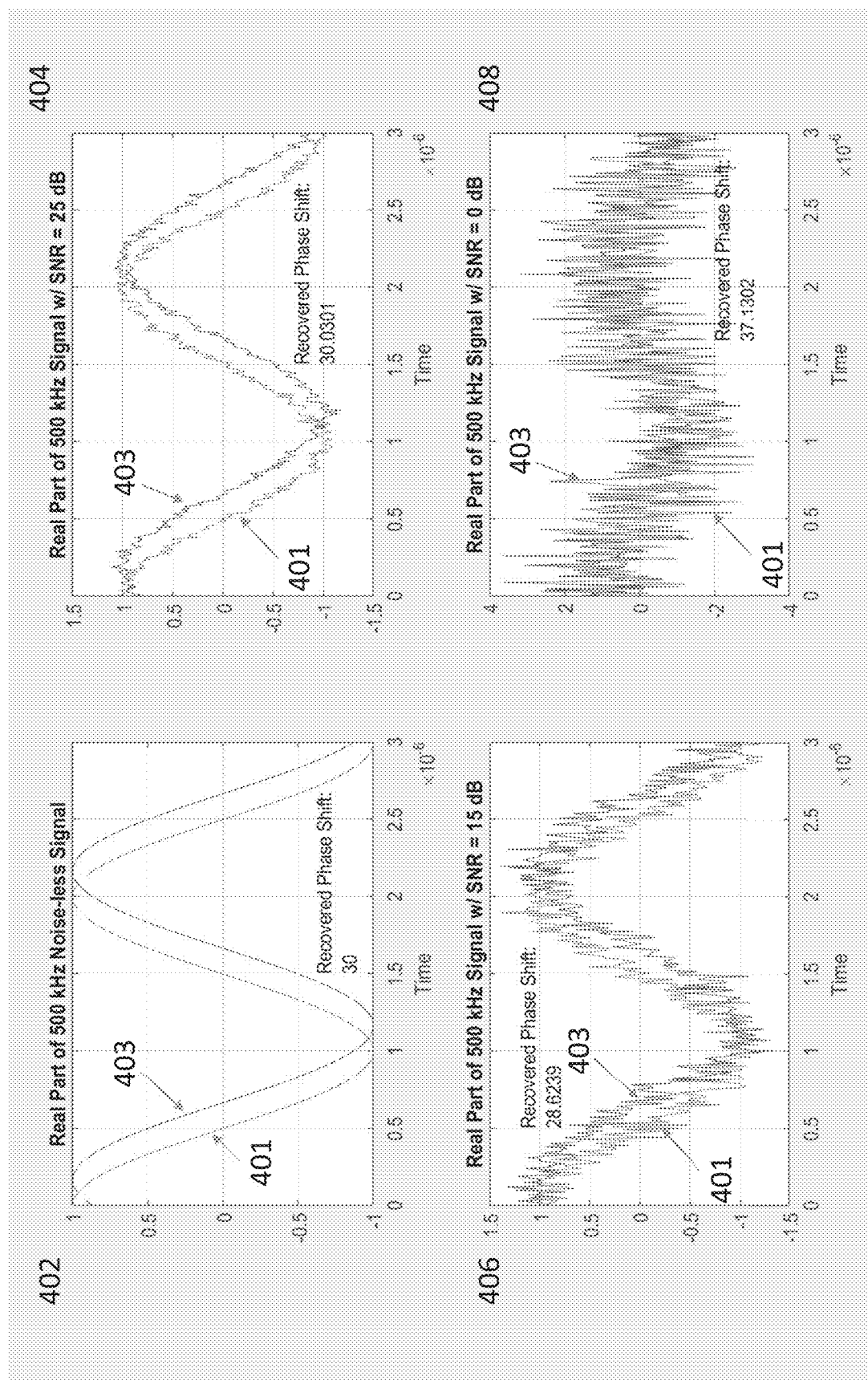
FIG. 4 shows time plots of example signals which may be received from a pair of antennas to illustrate the effects of signal noise on the accuracy of the phase shift determination.

While theoretically, the algorithm described herein can calculate the DoA using three antenna signals (e.g., from two secondary antennas and a reference antenna), noise in the signals can reduce the accuracy of the phase shift determination and thus multiple pairs of antenna signals may be preferred in embodiments, for reducing the impact of noise on the accuracy of the algorithm. For example, FIG. 4 shows graphs of example data which may be received from a pair of antennas according to some embodiments of the present disclosure. In the graphs of FIG. 4, the signal from a reference antenna is shown as the sinusoidal line 401, and the signal from a second antenna as the sinusoidal line 403. The graphs 402-408 show simulated raw signals from the antennas with different levels of noise (increasing from no noise in graph 402 to a large amount of noise in graph 408), and how this may affect the determined phase difference. As may be seen, the phase shift of 30° is accurately determined when the noise is minimal in graph 402. However as the noise in the signals increases, the determined phase shift becomes less accurate. Since these noise based errors may affect the direction determined from the measured phase difference, measurements (e.g., sampled antenna signals) from several pairs of antennas can be used in some embodiments to reduce the effect of noise on the calculated DoA.

Referring back to FIG. 3, the memory 314 includes information which is relevant to determining the direction to the emitter, such as information about the antenna geometry 326. The antenna geometry 326 may represent information about the physical positioning of the antennas (e.g., 112 of FIG. 1) relative to each other. The physical spacing of the antennas may determine the phase shift between the antennas, and thus may be useful in determining the direction to the target based on the measured phase shift. In particular, in embodiments measurements are taken with respect to a reference antenna, the antenna geometry 326 may represent information about the location of each antenna relative to the reference antenna.

Figure 5:
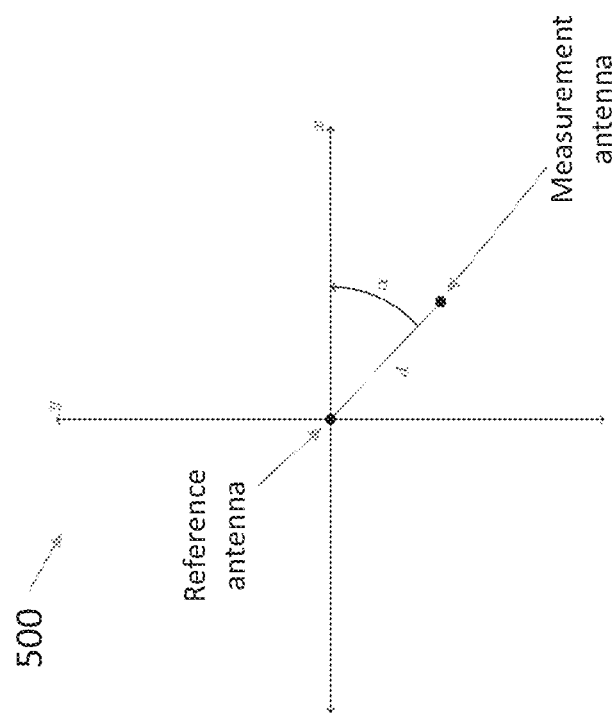
FIG. 5 shows a coordinate system and parameters for defining the relative position of a pair of antennas according to embodiments of the present disclosure.

FIG. 5 shows a coordinate system 500 associated with the plurality of antennas according to embodiments of the present disclosure. A Cartesian coordinate system is shown as an example in FIG. 5, however, it will be understood that in other examples, a different type of coordinate system may be used to define the geometry of the antenna, that is, the positional relationship between the plurality of antennas in the array. In the coordinate system 500, the location of a measurement antenna (e.g., one of the secondary antennas 204) is defined relative to a reference antenna (e.g., reference antenna 202) in terms of the distance d and angle α. Here the reference antenna is located at the origin of the coordinate system 500, and the measurement antenna is located a distance d and an angle α from the origin, which may be defined as a positive angle, measured from the line defining distance d towards the X-axis. The antenna array may include a plurality of measurement antennas, thus providing multiple pairs of antennas and consequently multiple measured phase shifts for use by the RDF algorithm, and the relative position of each of the measurement antennas may similarly be defined by their distance and angle from the reference antenna, positioned here for simplicity at the origin of the coordinate system 500.

Referring back to FIG. 3, the memory 314 may include antenna geometry information 326 which may include the direction and angles associated with each antenna in reference to a reference antenna. This information may be provided by the antenna array (e.g., stored in memory of the antenna array), may be programmed in by a user, or combinations thereof.

In some embodiments, all antenna pairs may use the same reference antenna, and may thus have a distance d and angle α measured from a same reference antenna (e.g., $d_1$ and $α_1$, $d_2$ and $α_2$, etc.). Other geometries (e.g., multiple secondary antennas and multiple reference antennas) may be used in other example embodiments. In some embodiments, a given antenna may function as a secondary antenna in one antenna pair and a reference antenna in a second antenna pair. The processor 306 may process and store the measured phase shifts and associate them with the antenna geometry 326 of the antennas used to calculate that measured phase shift.

As shown in FIG. 3, the instructions 316 may include a set of instructions 319 for generating possible phase shifts based on the measured phase shift (obtained at block 318). The instructions 319, when executed by processor 306, may cause the processor 306 to determine, for each measured phase shift (e.g., from each pair of antennas), a set of possible expected phase shifts based on the measured phase shift, the frequency at which the antennas were tuned, and the antenna geometry used to collect the measured phase shift. The measured phase shift may represent a 'wrapped' measurement (e.g., modulo 360°) of the expected phase shift based on the direction of arrival (DoA) of the signal from the emitter. Since different values of the expected phase shift may represent different DoA's, it may be necessary to 'unwrap' the measured phase shift into a set of possible (or unwrapped) expected phase shifts, each of which in turn may represent a different DoA. To find the true DoA, a fitting equation 328 may be fit to the possible (or unwrapped) expected phase shifts to find the optimized fitting parameters which allow the fitting equation to best match one of the expected phase shifts (and thus one of the possible DoAs), as explained in more detail with respect to boxes 320 to 324. Returning to box 319, the possible phase shifts may be determined, based in part on a coordinate system which defines the DoA of the emitted signal with respect to the geometry of one of the pairs of antenna as shown in FIGS. 6-7.

Figure 6:
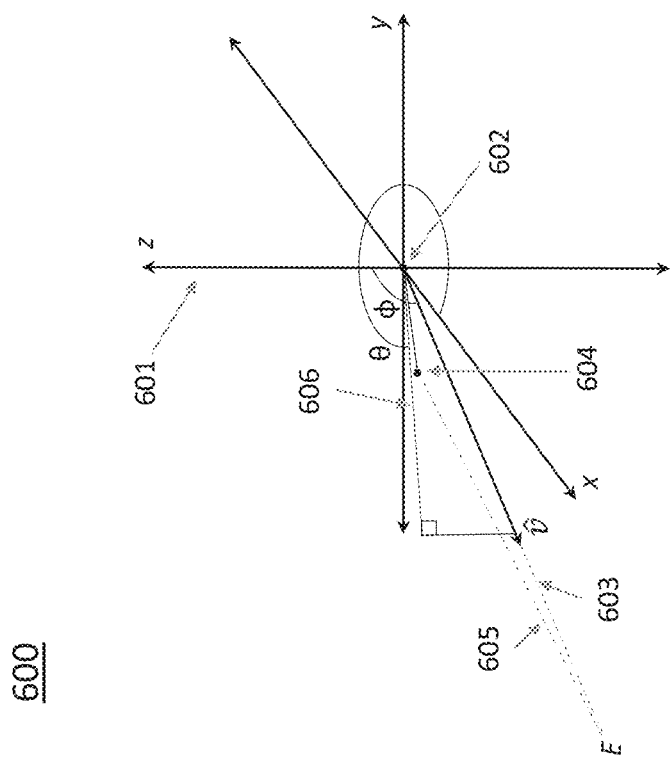
FIG. 6 shows direction vector from an antenna to the signal source (i.e. emitter E) and elevation and azimuth angles shown in reference to an example coordinate system associated with the antenna in accordance with the present disclosure.
Figure 7:
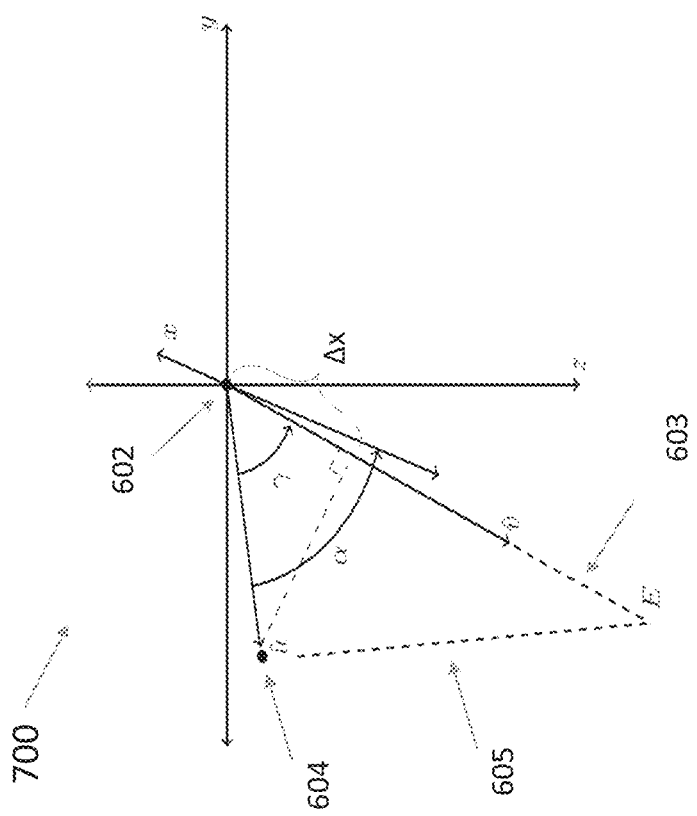
FIG. 7 shows the relationship of a pair of antennas and the signal source (i.e. emitter E) with reference to the antenna coordinate system.

FIGS. 6 and 7 are graphs showing the vectors from each of a pair of the antennas to the emitter E in relation to a coordinate system associated with the antennas. In each of the graphs 600 and 700, the signal from the emitter E is received by a pair of antenna (a reference antenna 602 and a secondary antenna 604). Graph 600 of FIG. 6 shows that the signal arrives from an emitter E, to a pair of antennas, a reference antenna 602 located at the origin of the coordinate frame, and a secondary antenna 604 located a distance d and angle α away from the reference antenna 602 (for clarity d and a are not shown in the graph 600). A vector v (v̂) represents the direction from the reference antenna 602 to the emitter E. The vector v may be defined, in relation to the coordinate system 601, by azimuth angle θ, which is the angle from the positive x axis, measured counterclockwise, to the projection 606 of the vector v onto the x-y plane, and elevation angle φ, which is the angle from the positive z axis to the vector v, with 90 degrees corresponding to the rotation between the z-axis and the x-y plane.

The graph 700 of FIG. 7 shows a more detailed view of the vectors which define the direction from each of the antennas to the emitter E. A unit vector v (v̂) denotes a direction from the reference antenna 602 towards the emitter E. The relationship of the unit vector v with reference to the coordinate frame may be defined as shown in graph 600 of FIG. 6 and is omitted from this graph for clarity. A unit vector u (û) denotes a direction from the reference antenna 602 towards the secondary antenna 604. In some cases, there may be an angle γ between the vectors u and v. For the sake of simplifying the calculations, and since the emitter E may be a significantly (e.g., orders of magnitude) larger distance from the antenna (as compared, for example, to the distance between the two antennas), the path of the transmission 603 from the emitter E to the reference antenna 602 and the path of the transmission 605 from the emitter E to the secondary antenna 604 may be considered (or approximated) as being substantially parallel to each other (e.g., approximating a planar wave front at the location of arrival, at each antenna). Accordingly the difference between the longer and shorter path lengths from the emitter E to the antennas may be designated Δx. Based on these terms, equations for u and v can be given by Equations 1 and 2 below:

$$û=(\cos(-\alpha)\sin(90°),\sin(-\alpha)\sin(90°),\cos(90°))=(\cos(\alpha),-\sin(\alpha),0) \quad \text{Eqn. 1}$$

$$v̂=(\cos(\theta)\sin(\phi),\sin(\theta)\sin(\phi),\cos(\phi)) \quad \text{Eqn. 2}$$

We can further simplify based on Eqn 3 and the knowledge that u and v are unit vectors to give Equations 3, 4, and 5 below:

$$\cos\gamma = \frac{\Delta x}{d} \quad \text{Eqn. 3}$$

$$\cos(\gamma) = û \cdot v̂ = \cos(\alpha)\cos(\theta)\sin(\phi) - \sin(\alpha)\sin(\theta)\sin(\phi) \quad \text{Eqn. 4}$$

$$\cos(\gamma) = \sin(\phi)\cos(\alpha + \theta) \quad \text{Eqn. 5}$$

Equations 4 and 5 each represent different expressions of cos(γ). These may be combined (and simplified) to yield equation 6, below:

$$\Delta x = d \sin(\phi)\cos(\alpha+\theta) \quad \text{Eqn. 6}$$

The distance Δx may also be expressed in in terms of the wavelength λ and the expected phase shift ΔΦ of the received signal, as shown by Equation 7, below. Equation 7 may be combined with Equation 6 to yield Equation 8, below:

$$\Delta x = \frac{\lambda}{2\pi}\Delta\Phi \quad \text{Eqn. 7}$$

$$\Delta\Phi = \frac{2\pi d}{\lambda}\sin(\phi)\cos(\alpha + \theta) \quad \text{Eqn. 8}$$

Equation 8 may be further tweaked by noting that elevation angles should be between 90° and 180° due to physical limitations of the signal and the assumption that in applications where the antennas are located on an aerial platform, the antenna array is generally located above the emitter (other assumptions may be used in other applications). Hence, the algebraic sign of ΔΦ, Δx, and cos(α+θ) should be determined by the sing of cos(α+θ), which in turn is dependent on the algebraic sign of Δx. In order to preserve this convention (that the phase shift is positive when the reference antenna receives the signal first), Equation 8 may be modified to Equation 9, below:

$$\Delta\Phi = -\frac{2\pi d}{\lambda}\sin(\phi)\cos(\alpha + \theta) \quad \text{Eqn. 9}$$

As may be seen from Equation 9, there is an inverse relationship between the expected phase difference ΔΦ and the wavelength λ. Accordingly, as the wavelength decreases (e.g., as the frequency increases) the expected phase shift ΔΦ may get larger. This represents a source of ambiguity in the measured phase shift. The measured phase shift will always be between −180° and 180°. However using Equation 9 it may be seen that the expected phase shift useful in calculating the direction of arrival may lie far outside the range of −180° and 180°. For example, using some reasonable assumptions for the various values, a signal with frequency 242 MHz may have a maximum expected phase shift of 180 degrees, while a signal with frequency 2.5 GHz may have a maximum expected phase shift of 1860 degrees. Accordingly, certain measured phase shifts may represent a "wrapped" value of the expected phase shift, where the expected phase shift is wrapped by adding/subtracting multiples of 360° until the expected phase shift is within the range of −180° and 180°. Since it may initially be unknown how many times the signal is wrapped, there may be ambiguity in the expected phase shift represented by the measured phase shift, which in turn may lead to ambiguity in the calculated direction of arrival. In other words, the measured phase shift may correspond to multiple pairs of elevation and azimuth values, only one of which represents a true direction towards the emitter.

One solution is to use antenna separation of (e.g., by setting the distance d) to half the wavelength of the highest frequency to be observed. However, this may be physically impractical. For one thing, if the highest frequency of interest is high enough, the spatial limitations of placing the antennas that close together may be prohibitive. For another, close spacing of antennas may cause problems for shorter wavelength signals and increase the SNR needed to accurately measure the direction of arrival. The present disclosure presents a method which does not require altering the spacing of the antennas to resolve the ambiguity problem (except to standardize the distance between the secondary antennas and the reference antenna, where needed).

The algorithm described herein may operate on antenna arrays which have at least two antenna pairs (e.g., 3 or more antennas) and where there is an antenna designated as the reference antenna (herein labelled antenna 1) and the distance between the reference antenna and any other antenna in the array is a fixed value. In other words, the distance $d_{1k}$ from a reference antenna to a secondary antenna k, is a constant independent of the value of k.

Referring back to FIG. 3, the block 319 may include instructions, to be executed by processor 306, for generating a set of possible phase shifts based on a measured phase shift. The possible phase shifts may be calculated by unwrapping the measured value of the phase shift using Equation 9 above to produce a set of possible expected phase shifts as described above. The measured phase shifts $\Delta\Phi^{(M)}$ may be thought of samplings of the function of Equation 10, and its dependent Equations 11 and 12 which may be abstracted from Equation 9:

$$F(\alpha) = A\cos(\alpha + \varphi) \quad \text{Eqn. 10}$$

$$A = -\frac{2\pi d}{\lambda}\sin(\phi) \quad \text{Eqn. 11}$$

$$\varphi = \theta \quad \text{Eqn. 12}$$

In Equations 10-12, A represents the amplitude and <p represents the initial phase. The abstraction to the function of equation 10 may be made possible since the amplitude A and initial phase <p are independent of which antenna pair is being examined. Accordingly, the measured signal at each antenna pair may represent a sampling of Equation 10 for different values of the angle α, which defines the rotation to the secondary antenna.

Figure 8:
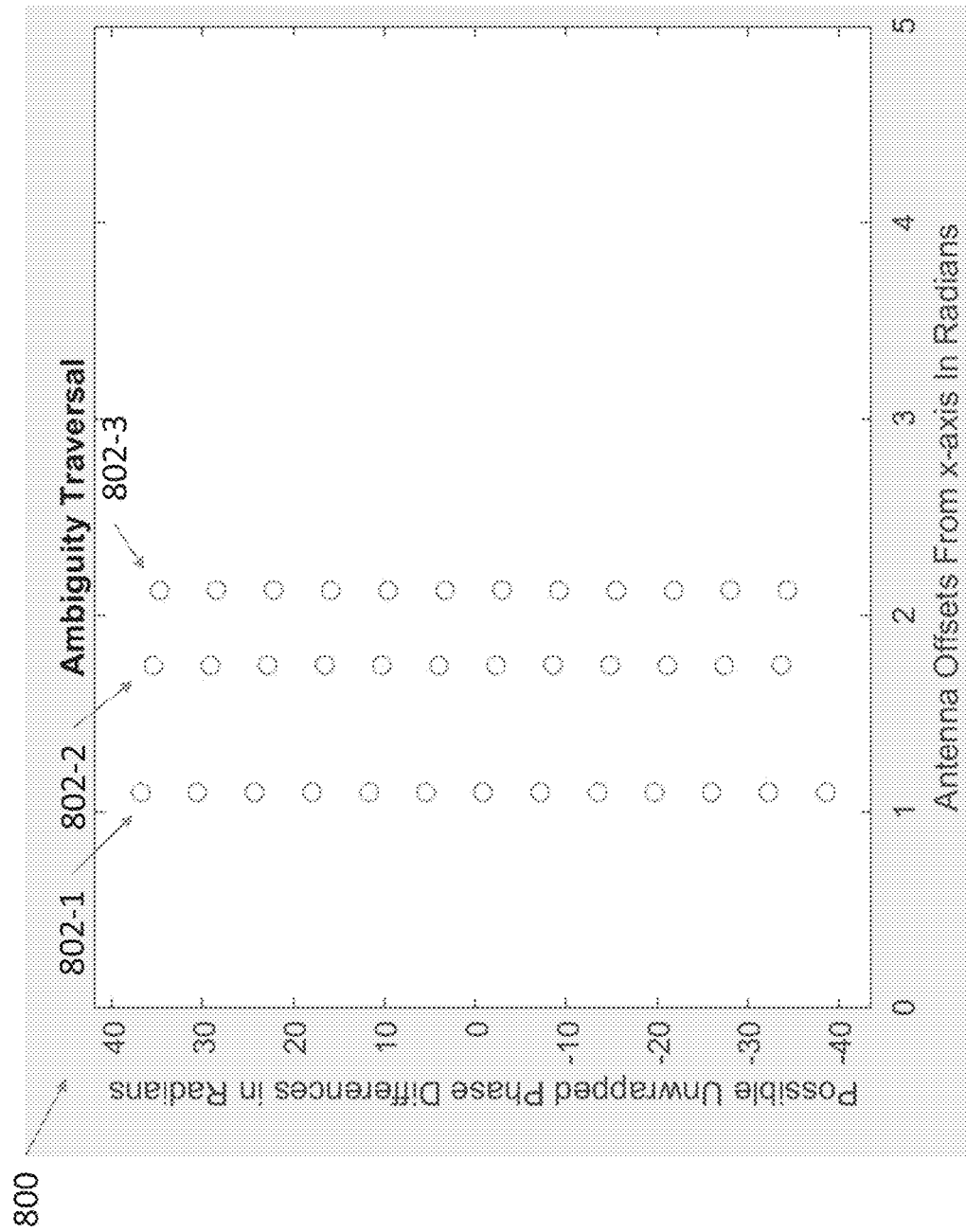
FIG. 8 is a graph of possible phase shifts according to an example embodiment of the present disclosure.

FIG. 8 is a graph of possible (or unwrapped) phase shifts according to one example of the present disclosure. As described herein, possible phase shifts are calculated (e.g., per the executable instructions of block 319) based on a measured phase shift by unwrapping each measured phase shift using equations 10-12. Graph 800 of FIG. 8 shows an example in which the possible phase shifts for three different pairs of antennas, all measured with respect to a common reference antenna, have been determined. The x-axis shows the value of α, which is the angle between the antenna and the x-axis, in radians. For each of the measured phase shift, a set of possible expected phase shifts (e.g., 802-1, 802-2, and 802-3) is determined (represented in the example in FIG. 8 as the three columns of dots, each dot representing a possible phase shift, in radians), which includes the measured phase shift. Since the frequency is known, we may modify Equation 9 into an expression of the maximum range of possible phase shifts, as given by equation 13, below:

$$\left|\Delta\Phi_{1k}^{(M)}\right| = \left|-\frac{2\pi d}{\lambda}\sin(\phi)\cos(\alpha_k + \theta)\right| \le \frac{2\pi d}{\lambda} := M \quad \text{Eqn. 13}$$

The notation $\Delta\Phi_{1k}^{(M)}$ represents the measured phase shift between the reference antenna (antenna 1) and antenna k, where the superscript (M) represents a measurement (e.g., as opposed to a calculated value). Accordingly $\Delta\Phi_{12}$ may represent the measured phase shift between a first antenna (a reference antenna) and a second antenna (a secondary antenna). The notation $\alpha_k$ represents the clockwise measured positive angle between the positive x-axis and the unit vector with tail at antenna 1 which points to antenna k. Based on equation 13, the number of possible wraps n represented by the range between 0° and the maximum M may be found by equation 14, which simplifies to equation 15, which in turn can be expressed as equation 16, below:

$$n_k = \left\{n \in \mathbb{Z} : -\frac{2\pi d}{\lambda} \le \Delta\Phi_{1k}^{(M)} + 2\pi n \le \frac{2\pi d}{\lambda}\right\} \quad \text{Eqn. 14}$$

$$n_k = \left[-\frac{d}{\lambda} - \frac{\Delta\phi_{1k}^{(M)}}{2\pi}, \frac{d}{\lambda} - \frac{\Delta\phi_{1k}^{(M)}}{2\pi}\right] \cap \mathbb{Z} \quad \text{Eqn. 15}$$

-continued $$n_k = \left\{\left\lceil-\frac{d}{\lambda} - \frac{\Delta\phi_{1k}^{(M)}}{2\pi}\right\rceil, \left\lceil-\frac{d}{\lambda} - \frac{\Delta\phi_{1k}^{(M)}}{2\pi}\right\rceil + 1, \ldots, \left\lfloor\frac{d}{\lambda} - \frac{\Delta\phi_{1k}^{(M)}}{2\pi}\right\rfloor\right\} \quad \text{Eqn. 16}$$

For convenience, let $l_k = |n_k|$ for k=2, 3, . . . , N and let L=max{$l_k$: k=2, 3, . . . , N}. The set of unwrapped phase differences may be expressed as an L×(N−1) matrix U, as defined (element wise) by equation 17, below:

$$U_{ij} = \begin{cases} \Delta\phi_{1,j+1}^{(M)} + 2\pi[\min(n_{j+1}+i-1)] & i \le l_{j+1} \\ 0 & i > l_{j+1} \end{cases} \quad \text{Eqn. 17}$$

Equation 17 gives the values of the matrix U on an element by element basis. Accordingly, the $j^{th}$ column of the matrix U consists of the potential unwrapped phase differences between antenna 1 (the reference antenna) and antenna j+1 (one of the secondary antennas) in ascending order. Entries of 0 are used to fill out the matrix.

Referring back to FIG. 3, the memory 314 may further include a set of instructions 320 and 322, to be executed by processor 306, for performing steps associated with fitting an equation to the possible phase shifts generated in the matrix of Eqn. 16 (e.g., at block 319). Through this process of fitting an equation to the possible phase shifts, the processor 306 determines which of the possible phase shifts represent the true phase shifts, which in turn allow for an accurate determination of the direction of arrival (DoA) of the RF signal from the emitter. In other words, the process of equation fitting is used to resolve the ambiguity in the phase shift, and the process described herein does so in an iterative manner (e.g., through an iterative minimum finder (or optimization) process).

Figure 9:
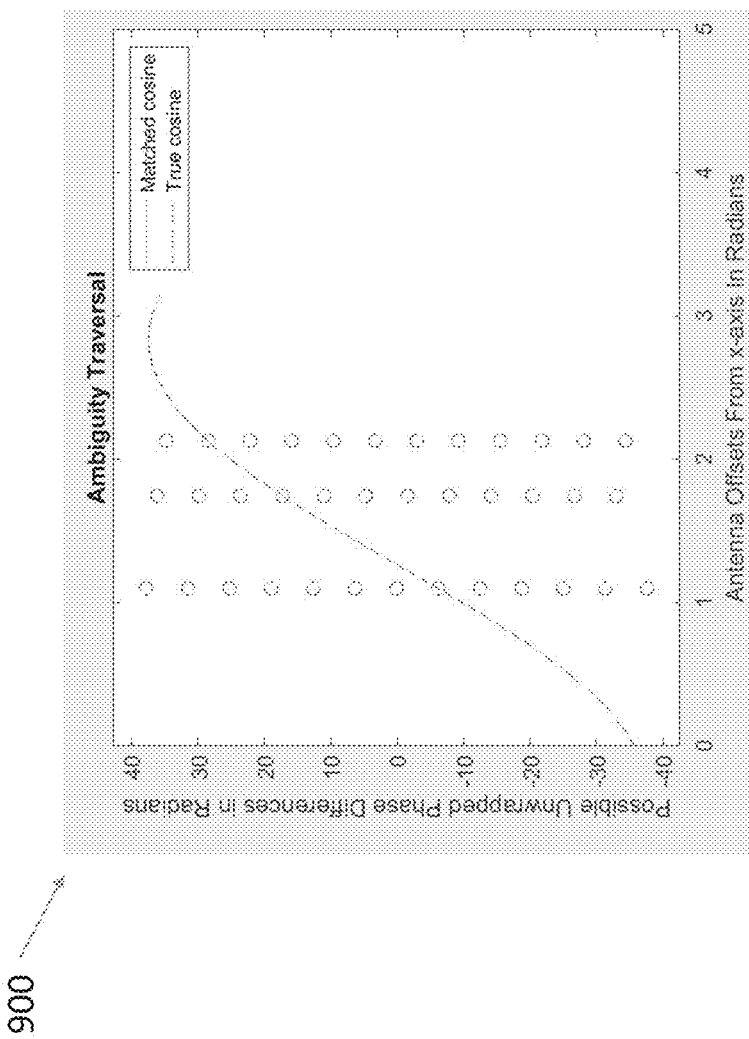
FIG. 9 is a graph representing fitting of an equation to the possible phase shifts according to some embodiments of the present disclosure.

FIG. 9 is a graph showing an example of fitting of an equation to the possible phase shifts illustrated in the graph 800 of FIG. 8. The fitted equation can be described as an equation which best fits a plurality of phase difference values, this plurality consisting of one difference value from each set (e.g., 802-1, 802-2, and 802-3) of possible phase differences. It should be understood that the graph 900 may represent an idealized fitting process (e.g., the fitting line exactly matches data points), however real scenarios may involve more noisy data and/or a less perfect fit.

In this example, since three antenna pairs are used for the calculations performed by the algorithm, the equation is fitted to include three phase difference values, one associated with each antenna pair. The equation may take the form of a minimization of the function given by equation 18, below:

$$G(A, \varphi) = \sum_{j=1}^{N-1} \min_{i=1,\ldots,l_{j+1}} |U(i, j) - A\cos(\alpha_j + \varphi)| \quad \text{Eqn. 18}$$

As such, the process of equation fitting may be described as an optimization of the previously discussed cosine equation (Eqn. 10) which is optimized by minimizing the function of Eqn. 18. Once the equation has been fit to the measured data points, the amplitude A and initial phase φ may be used to determine the elevation φ and azimuth angles θ as shown by equations 19 and 20 below:

$$A = -\frac{2\pi d}{\lambda}\sin(\phi) \Rightarrow \phi = \sin^{-1}\left(-\frac{A\lambda}{2\pi d}\right) \quad \text{Eqn. 19}$$

$$\theta = \varphi \quad \text{Eqn. 20}$$

In accordance with the present disclosure, and instead of solving the above minimization problem to find a global minimum of Eqn. 18, the processor 306, as configured by the executable instructions 316, performs the optimization iteratively, by finding local minima for each of a plurality of segments of the solution space, as defined by the initial guesses, and then determining the global minimum from the plurality of local minima, thus improving the computational efficiency of ambiguity resolution in the RDF process. Referring back to FIG. 3, the instructions 316 include a subset of instructions 320 for generating a set of initial guesses for fitting parameters, and another subset of instructions 322 for performing an optimization (e.g., using a Gauss-Newton method) using the set of initial guesses, as described further below. In order to minimize the function of equation 18, a Gauss-Newton or any other suitable optimization method may be used. For example, in the case of GN optimization, the Gauss-Newton (GN) method may operate by iteratively searching for least-squares based on an initial guess. The GN method may thus take the form of minimizing an equation of the form given by Equation 21, below, where the functions $f_1$ to $f_m$ represent residuals. In this case, as shown by Equation 22, below, the functions fj represent equations of the form given by Equation 18.

$$S(\bar{x}) = \sum_{j=1}^{N-1} f_j^2(\bar{x}) \quad \text{Eqn. 21}$$

where, $$f_j(A, \varphi) = \min_{i=1,\ldots,I_{j+1}} |U(i,j) - A\cos(\alpha_{j+1}+\varphi)| \text{ for } j = 1, \quad \text{Eqn. 22}$$

$$2, 3, \ldots, N-1$$

In order to improve the efficiency of the algorithm, the instructions (or block) 320 may include picking a set of reasonable initial guesses for the amplitude A and initial phase φ, which may be used to seed runs of the GN algorithm given by equations 21 and 22. The amplitude A and initial phase p may each be bound by physical constraints which may limit the possible range of values which each can have. A matrix of initial guesses may be generated by picking reasonable guesses for A and (p and then taking the combinations of those guesses. For example, since maximum and minimum values of A and p are known, the space between the max and min may divided into a number of evenly spaced guesses. In some embodiments, there may be a different number of guesses for the amplitude A than there are for the initial phase p. For example, there may be about 80 amplitude guesses and 20 initial phase guesses. Other numbers of initial guesses may be used in other example embodiments.

The minimization may be accomplished by using a Gauss-Newton update equation, as shown below in Equation 23:

$$G_{q+1} = G_q - (J_f^T J_f)^{-1} J_f^T f(G_q) \quad \text{Eq. 23}$$

$$f = (f_1, f_2, \ldots, f_{N-1})^T \quad \text{Eq. 24}$$

$$J_f = \begin{bmatrix} \frac{\partial f_1}{\partial A}(G_q) & \frac{\partial f_1}{\partial \varphi}(G_q) \\ \vdots & \vdots \\ \frac{\partial f_{N-1}}{\partial A}(G_q) & \frac{\partial f_{N-1}}{\partial \varphi}(G_q) \end{bmatrix} \quad \text{Eq. 25}$$

In equations 23 the term f is given by Equation 24, and the Jacobian matrix $J_f$ is given by Equation 25. The value q tracks a number of iterations which have been run on the Gauss Newton optimization. Equation 23 may be initialized using an initial guess $G_0$ which is based on a set of initial guesses for the amplitude ($A_0$) and initial phase ($\varphi_0$) as given by Equation 26 below:

$$G_0 = [A_0, \varphi_0]^T \quad \text{Eqn. 26}$$

The Jacobian matrix given by Equation 25 may be derived by noting that, for each iteration q, for each residual $f_j$, j=1, 2, ... N−1, the residual $f_j$ is given by equation 27, below:

$$f_j(A, \psi) = |U_{ij} - A\cos(a_{j+1}+\varphi)| \quad \text{Eqn. 27}$$

for some integer I, where $I \in [1, 1_{j+1}] \cap \mathbb{Z}$. For convenience, we can arrive at Equation 28 by defining a sequence of terms $\{s_2, s_3, \ldots s_{N-1}\}$, as given by Equation 28 below:

$$s_{j+1} = \begin{cases} 1 & \text{if } U_{Ij} - A\cos(\alpha_{j+1} + \varphi) > 0 \\ 0 & \text{if } U_{Ij} - A\cos(\alpha_{j+1} + \varphi) = 0 \\ -1 & \text{if } U_{Ij} - A\cos(\alpha_{j+1} + \varphi) < 0 \end{cases} \quad \text{Eqn. 28}$$

$$\frac{\partial f_j}{\partial A} = -s_{j+1}\cos(\alpha_{j+1} + \psi) \quad \text{Eqn. 29}$$

$$\frac{\partial f_j}{\partial \varphi} = s_{j+1} A \sin(\alpha_{j+1} + \varphi) \text{ for } s_{j+1} \neq 0 \quad \text{Eqn. 30}$$

Equations 29 and 30 may be valid for conditions where $s_{j+1}$ is not equal to 0. However, this may be reasonable since it is extremely unlikely for $U_{Ij}$ and A $\cos(\alpha_{j+1}+<\varphi)$ to be equal to each other. Since the partial derivatives involved in the Jacobian matrix involve $s_{j+1}$, the values of the $s_{j+1}$ for each value of j from 1 to N−1 are updated on each iteration of the optimization (e.g., for each q). Accordingly, each unwrapped phase may be considered for each iteration of the optimization.

The instructions (or block) 322, when executed by processor 306, cause the processor to perform optimization, such as GN optimization. The GN algorithm may be run for each of the initial guesses to generate a set of preliminary optimized parameters (e.g., an optimized A and optimized φ). Each of these preliminary optimized parameters may represent a local minimum for the solution space segment defined by the given set of initial guesses of amplitude and phase. The sets of preliminary optimized parameters, which represent local minima of the Equation 17 may then be used to find the best optimized parameter which would correspond to the global minimum of equation. For example, the set of preliminary optimized parameters which best minimizes the function of Equation 17 may be selected as the best optimized parameter of final solution of the iterative minimum finder process, and these best optimized parameters may be used (e.g., with Equations 18 and 19) to then find the DoA (e.g., the elevation and azimuth angles).

In some embodiments, the different runs (or iterations) of the optimization process (e.g., the GN optimization step) may be further controlled to improve computational efficiency of the RDF algorithm. For example, the processor 306 may terminate any run (or iteration) which does not settle or converge to an optimal solution (i.e., to a local minimum) within a predetermined amount of time and/or predetermined number of optimization steps (e.g., 30 steps, as an example). In other words, the run may be terminated when q in Eqn. 23 exceeds a threshold value. The determination of convergence to an optimal solution may be based on accepted statistical measure. For example, the run may terminated when the difference between subsequent values of the Eqn. 23 are within a given tolerance. In some examples, the processor 306 may determine that a solution has converged when the solution of successive steps varies by about $1e^{-4}$ or less. The computational efficiency of the RDF algorithm may be further increase by adjusting the convergence criteria (e.g., the maximum threshold difference between successive steps in a given optimization run) and/or the maximum number of steps for a non-converging run.

As further shown in FIG. 3, the instructions 316 may further include a set of instructions 324 for determining the direction of arrival based on the optimized fitting parameters. Any suitable method for determining the angle of arrival from a known amplitude and phase of the signal can be used by processor 306. For example, once the amplitude and phase of the signal have been unambiguously determined (as the set of best fitting parameters obtained from the earlier steps), the determined amplitude and phase values may be plugged into Equations 18 and 19 above to find the direction of arrival of the RF signal from the emitter.

As previously discussed, and given the enhanced computational efficiency and speed of the disclosed RDF algorithm, the processor 306 may continuously or periodically re-calculate the DoA of a signal by executing the instructions 316 described herein. The processor 306 may be configured to repeat the RDF process (e.g., to update the calculation of the DoA with a new set of measurements taken from the antenna array) at a set refresh rate, for example every 10, 20, 30, 40, 50, 60, 70, 80, 90, or 100 msec (or faster or slower refresh rate as may be practical or desired for a particular use scenario). The signals from the antennas may be sampled (e.g., to update the measurements 330) at a rate based, in part, at the expected speed at which the DoA information is updated.

Figure 10:
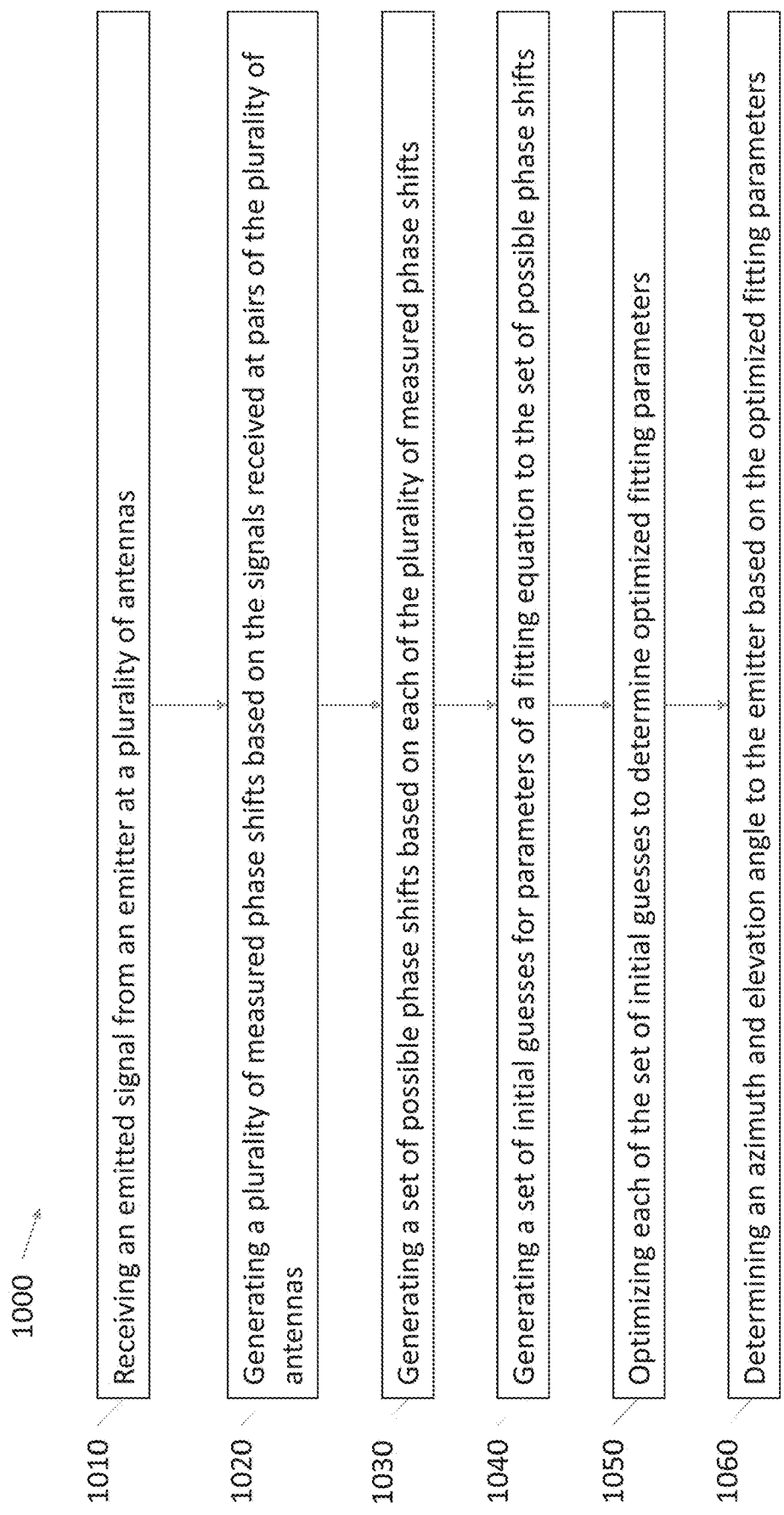
FIG. 10 shows a flow diagram of a processor-implemented RDF method in accordance with examples of the present disclosure

FIG. 10 shows a flow diagram of a processor-implemented radio direction finding method in accordance with examples of the present disclosure. The method 1000 may be implemented by one or more of the devices or systems described herein. For example, the method 1000 may describe the instructions 316 when executed by the processor.

The method 1000 includes box 1010 which describes receiving an emitted signal from an emitter at a plurality of antennas. In some embodiments, an antenna array (e.g., 110 of FIG. 1) includes a number of antennas and one is designated as the reference, while a remainder of the plurality of antennas are secondary antennas. The method 1000 may also include tuning the plurality of antennas to a frequency of the emitted signal. The plurality of antennas each generate respective antenna signals (e.g., a reference antenna signal and a plurality of secondary antenna signals) based on the received emitted signal.

The method 1000 includes box 1020, which describes generating a plurality of measured phase shifts based on the signals received at pairs of the plurality of antennas. For example, the secondary antenna signals are compared to the reference signal to determine a phase shift between each antenna signal and the reference signal. Various known techniques may be used to determine the phase shift of the signals.

In some embodiments, the method 1000 may also include additional steps such as sampling, processing, and/or conditioning the antenna signals. For example, the reference and secondary antenna signals may be sampled in time and converted to digital signals (e.g., by capture/signal processing electronics 108).

The method includes box 1030, which describes generating a set of possible phase shifts based on each of the plurality of measured phase shifts. Each measured phase shift may represent a wrapped value of an expected phase shift. However how many times the expected phase shift was 'wrapped' may not be initially known. Box 1030 describes generating each possible 'unwrapped' value which may be represented by each of the measured phase shifts. For example, the method 1000 may include taking each measured value X and generating a set of possible phase shifts X+n*360° within a range which may be determined, in part, on the frequency of the emitted signal (e.g., as given by Eqn. 15, above) and the physical relationship between the reference antenna and the respective one of the plurality of secondary antennas used to generate the measured phase difference.

The method 1000 includes box 1040, which describes generating a set of initial guesses for parameters of a fitting equation to the set of possible phase shifts. For example, box 1040 includes fitting a cosine equation (e.g., Eqn. 10, above) to the set of possible phase shifts to determine which of the set of possible phase shifts represent the correct phase shifts. Box 1040 includes generating a set of initial guesses for fitting parameters such as an amplitude and initial phase of the cosine equation. For example, box 1040 may involve determining a range of possible values for the amplitude and initial phase, dividing the range into a number of steps, and then taking each pair of steps for the amplitude and range as an initial guess.

The method 1000 includes box 1050 which describes optimizing each of the set initial guesses to determine optimized fitting parameters. A Gauss-Newton algorithm may be run based on each of the set of initial guesses. The optimization of each initial guess generates a preliminary optimized fitting parameter. One of the preliminary optimized fitting parameters may be selected as the optimized fitting parameter. For example a minimum of the preliminary optimized fitting parameters may be selected as the optimized fitting parameter. In some embodiments, the method 1000 may also include filtering the runs of the Gauss-Newton algorithm. For example, a number of iterations of each run may be monitored, and a run may be terminated early if it is failing to settle on a solution.

The method 1000 includes box 1060 which describes determining an azimuth and elevation angel to the emitter based on the optimized fitting parameters. The optimized fitting parameters may be used to calculate the DoA (e.g., based on Eqns. 11 and 12).

Figure 11:
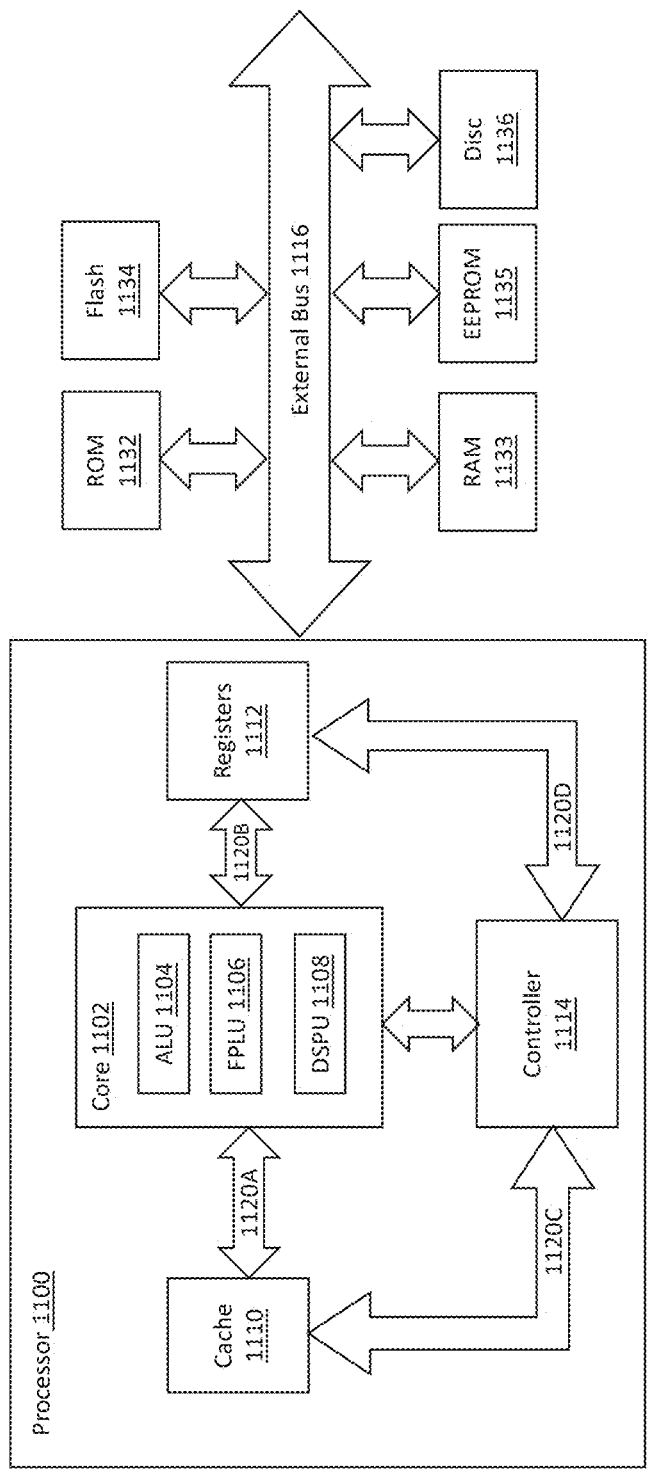
FIG. 11 is a block diagram of an example processor that can be configured to execute an RDF algorithm in accordance with the present disclosure.

FIG. 11 is a block diagram illustrating an example processor 1100 which can be configured to execute an RDF algorithm according to principles of the present disclosure. Processor 1100 may be used to implement one or more processors described herein, for example, processor 107 of FIG. 1, processor 216 of FIG. 2, or processor 306 of FIG. 3. The term processor may be interchangeable with the term processing unit or processor circuit if used herein. Processor 1100 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof. The processor 1100 may include one or more cores 1102. The core 1102 may include one or more arithmetic logic units (ALU) 1104. In some embodiments, the core 1102 may include a floating point logic unit (FPLU) 1106 and/or a digital signal processing unit (DSPU) 1108 in addition to or instead of the ALU 1104. The processor 1100 may include one or more registers 1112 communicatively coupled to the core 1102. The registers 1112 may be implemented using dedicated logic gate circuits (e.g., flip-flops) and/or any memory technology. In some embodiments the registers 1112 may be implemented using static memory. The register may provide data, instructions and addresses to the core 1102.

In some embodiments, processor 1100 includes one or more levels of cache memory 1110 communicatively coupled to the core 1102. The cache memory 1110 may provide computer-readable instructions to the core 1102 for execution. The cache memory 1110 may provide data for processing by the core 1102. In some embodiments, the computer-readable instructions (e.g., instructions 316) may have been provided to the cache memory 1110 by a local memory (e.g., memory 314), for example, local memory attached to the external bus 1116. The cache memory 1110 may be implemented with any suitable cache memory type, for example, metal-oxide semiconductor (MOS) memory such as static random access memory (SRAM), dynamic random access memory (DRAM), and/or any other suitable memory technology.

In some embodiments, the processor 1100 includes a controller 1114, which may control input to the processor 1100 from other processors and/or components included in a system (e.g., control panel 252 and scan converter 230 shown in FIG. 2) and/or outputs from the processor 1100 to other processors and/or components included in the system (e.g., display 238 and volume renderer 234 shown in FIG. 2). Controller 1114 may control the data paths in the ALU 1104, FPLU 1106 and/or DSPU 1108. Controller 1114 may be implemented as one or more state machines, data paths and/or dedicated control logic. The gates of controller 1114 may be implemented as standalone gates, FPGA, ASIC or any other suitable technology. The registers 1112 and the cache memory 1110 may communicate with controller 1114 and core 1102 via internal connections 1120A, 1120B, 1120C and 1120D. Internal connections may implemented as a bus, multiplexor, crossbar switch, and/or any other suitable connection technology.

Inputs and outputs for the processor 1100 may be provided via a bus 1116, which may include one or more conductive lines. The bus 1116 may be communicatively coupled to one or more components of processor 1100, for example the controller 1114, cache memory 1110, and/or register 1112. The bus 1116 may be coupled to one or more components of the system, such as display 238 and control panel 252 mentioned previously.

The bus 1116 may be coupled to one or more external memories (e.g., memory 314). In some embodiments, the one or more external memories may include Read Only Memory (ROM) 1132. ROM 1132 may be a masked ROM, Electronically Programmable Read Only Memory (EPROM) or any other suitable technology. The external memory may include Random Access Memory (RAM) 1133. RAM 1133 may be a static RAM, battery backed up static RAM, Dynamic RAM (DRAM) or any other suitable technology. The external memory may include Electrically Erasable Programmable Read Only Memory (EEPROM) 1135. The external memory may include Flash memory 1134. The external memory may include a magnetic storage device such as disc 1136. In some embodiments, the external memories may be included in a system, such as ultrasound imaging system 200 shown in FIG. 2, for example local memory 242.

It should be understood that any one of the examples, embodiments or processes described herein may be combined with one or more other examples, embodiments and/or processes or be separated and/or performed amongst separate devices or device portions in accordance with the present systems, devices and methods. Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
 receiving an emitted signal from an emitter at a first antenna and a second antenna;
 determining measured phase shifts between the emitted signal received by the first antenna and the emitted signal received by the second antenna compared to a respective reference antenna;
 calculating a plurality of possible phase shifts based on the measured phase shifts;
 fitting parameters of a cosine function to the plurality of possible phase shifts, the fitting comprising:
  selecting a set of initial guesses for the fitting parameters based on one or more possible values of the fitting parameters;
  optimizing each of the set of initial guesses to generate a set of optimized fitting parameters; and
  selecting one of the set of optimized fitting parameters; and
 determining elevation and azimuth angles to the emitter based on the selected one of the set of optimized parameters.

2. The method of claim 1, further comprising optimizing each of the set of initial guesses with a Gauss-Newton algorithm.

3. The method of claim 1, further comprising
 counting a number of iterations it takes each initial guess of the set of initial guesses to settle; and
 filtering the set of optimized fitting parameters based on the number of iterations.

4. The method of claim 1, further comprising selecting the set of initial guesses based, in part, on a frequency of the emitted signal.

5. The method of claim 1, wherein the fitting parameters include amplitude and initial phase of the cosine equation.

6. The method of claim 1, further comprising:
 receiving the emitted signal at a third antenna and a fourth antenna;

determining a second measured phase shift between the emitted signal received by the third antenna and the emitted signal received by the first antenna;

determining a third measured phase shift between the emitted signal received by the fourth antenna and the emitted signal received by the first antenna;

calculating a second plurality of possible phase shifts based on the second measured phase shift and calculating a third plurality of possible phase shifts based on the third measured phase shift; and fitting parameters of the cosine function to the possible phase shifts, the second plurality of possible phase shifts, and the third plurality of possible phase shifts.

7. The method of claim 1, further comprising calculating the plurality of possible phase shifts based on a frequency of the emitted signal.

8. The method of claim 1, further comprising directing a mobile platform based on the determined elevation and azimuth angles.

9. The method of claim 1, further comprising locating the emitter based on the determined elevation and azimuth angles.

10. The method of claim 1, further comprising:
sampling antenna signals from the first antenna and the second antenna to determine the measured phase shift; and
updating the determined elevation and azimuth angles based on each sample.

11. The method of claim 10, wherein the determined elevation and azimuth angles are updated every 10, 20, 30, 40, 50, 60, 70, 80, 90, or 100 msec.

12. An apparatus comprising:
an antenna array comprising a plurality of antennas, each configured to receive an emitted signal from an emitter and provide a respective antenna signal based on the received emitted signal;
a processor; and
a memory encoded with executable instructions, which when executed by the processor cause the processor to:
determine at least two measured phase shifts based on the antenna signals received from at least two pairs of antennas of the plurality of antennas;
determine a plurality of possible phase shifts based, at least in part, on the at least two measured phase shifts;
fit parameters of a cosine equation to the plurality of possible phase shifts by selecting a set of initial guesses for the parameters, wherein the set of initial guesses are based on one or more possible values of the fitting parameters, optimizing each of the set of initial guesses to generate a set of optimized fitting parameters and selecting one of the set of optimized fitting parameters; and
determine a direction of arrival of the emitted signal based on the selected one of the optimized fitting parameters.

13. The apparatus of claim 12, wherein the executable instructions, when executed by the at least one processor cause the apparatus to optimize each of the set of initial guesses using a Gauss-Newton algorithm.

14. The apparatus of claim 12, wherein the executable instructions, when executed by the at least one processor cause the apparatus to count a number of iterations of the Gauss-Newton algorithm for each of the set of initial guesses and terminate runs where the number of iterations crosses a threshold.

15. The apparatus claim 12, further comprising a mobile platform, wherein the antenna array is mounted on mobile platform.

16. The apparatus of claim 12, further comprising a tuner configured to tune the plurality of antennas to a frequency between 30 MHz and 3 GHz.

17. The apparatus of claim 12, wherein one of the plurality of antennas is designated as a reference antenna, and wherein a remainder of the plurality of antennas are designated as secondary antennas, and wherein the plurality of possible phase shifts are calculated between each of the secondary antennas and the reference antenna.

18. The apparatus of claim 12, wherein the antenna array has circular geometry, rectangular geometry, or combinations thereof.

19. The apparatus of claim 12, further comprising capture electronics configured to sample the antenna signals from the plurality of antennas.

20. The apparatus of claim 19, further comprising a switch configured to selectively couple a selected one of the plurality of antennas to the capture electronics.

21. A method comprising:
receiving an emitted signal from an emitter at a plurality of antennas;
generating a plurality of measured phase shifts based on the signals received at pairs of the plurality of antennas;
generating a set of possible phase shifts based on each of the plurality of measured phase shifts;
generating a set of initial guesses for parameters of a fitting equation to the set of possible phase shifts, wherein the set of initial guesses are based on one or more possible values of the fitting parameters;
optimizing each of the set of initial guesses to determine optimized fitting parameters; and
determining an azimuth and elevation angle to the emitter based on the optimized fitting parameters.

22. The method of claim 21, wherein the fitting equation is a cosine equation and wherein the fitting parameters are an amplitude and initial phase of the cosine equation.

23. The method of claim 21, further comprising optimizing each of the set of initial guesses to generate a set of preliminary optimized fitting parameters and selecting one of the set of preliminary optimized fitting parameters as the optimized fitting parameters.

24. The method of claim 23, further comprising:
determining if the optimization for each of the set of initial guesses is settling; and
terminating the optimization of selected ones of the set of initial guesses which are not settling.

25. The method of claim 21, further comprising optimizing each of the set of initial guesses using a Gauss-Newton algorithm.

26. The method of claim 21, further comprising tuning the plurality of antennas.

27. The method of claim 21, further comprising generating the set of possible phase shifts for a respective one the plurality of measured phase shifts based on the physical relationship between the pair of the plurality of antennas associated with the respective one of the plurality of measured phase shifts.

* * * * *